(12) United States Patent
Tempel

(10) Patent No.: US 11,434,629 B2
(45) Date of Patent: Sep. 6, 2022

(54) SANITARY INSERTION UNIT

(71) Applicant: Neoperl GmbH, Mullheim (DE)

(72) Inventor: Marc Tempel, Freiburg (DE)

(73) Assignee: NEOPERL GMBH, Mullheim (DE)

( * ) Notice: Subject to any disclaimer, the term of this patent is extended or adjusted under 35 U.S.C. 154(b) by 829 days.

(21) Appl. No.: 16/085,643

(22) PCT Filed: Apr. 24, 2017

(86) PCT No.: PCT/EP2017/000503
§ 371 (c)(1),
(2) Date: Sep. 17, 2018

(87) PCT Pub. No.: WO2017/207080
PCT Pub. Date: Dec. 7, 2017

(65) Prior Publication Data
US 2020/0318329 A1   Oct. 8, 2020

(30) Foreign Application Priority Data

May 28, 2016   (DE) ..................... 20 2016 003 402.3

(51) Int. Cl.
| | |
|---|---|
| *E03C 1/10* | (2006.01) |
| *E03C 1/084* | (2006.01) |
| *E03C 1/08* | (2006.01) |
| *F16K 47/02* | (2006.01) |
| *F16K 17/04* | (2006.01) |

(52) U.S. Cl.
CPC ................ *E03C 1/104* (2013.01); *E03C 1/08* (2013.01); *E03C 1/084* (2013.01); *F16K 17/0433* (2013.01); *F16K 47/023* (2013.01)

(58) Field of Classification Search
CPC . E03C 1/104; E03C 1/08; E03C 1/084; F16K 47/023; F16K 17/0433
USPC ................................................ 137/514–514.7
See application file for complete search history.

(56) References Cited

U.S. PATENT DOCUMENTS

| | | | | |
|---|---|---|---|---|
| 3,848,632 A | * | 11/1974 | Powell ................ | F16K 17/0433 137/514 |
| 4,099,536 A | * | 7/1978 | Dower ..................... | F16L 55/04 137/487 |
| 4,321,945 A | * | 3/1982 | Chabat-Courrede ........................ | F16K 17/0433 137/514.7 |
| 4,531,542 A | * | 7/1985 | Looney ............... | F16K 17/0406 137/514.7 |

(Continued)

FOREIGN PATENT DOCUMENTS

| | | |
|---|---|---|
| DE | 2650934 | 5/1978 |
| DE | 3446425 | 6/1986 |

(Continued)

*Primary Examiner* — Patrick C Williams
(74) *Attorney, Agent, or Firm* — Volpe Koenig

(57) ABSTRACT

A sanitary insertion unit (1), including an insertion housing (6), in which insertion housing a valve having a valve piston (10) is provided, which valve piston is slidably guided in the insertion housing and can be moved from a resting position under the pressure of the inflowing water against the restoring force of at least one restoring element (11). The restoring unit has at least one movement damper (12, 13), which damps or brakes the movement of the valve piston from the resting position to the open position.

37 Claims, 17 Drawing Sheets

(56) References Cited

U.S. PATENT DOCUMENTS

| | | | |
|---|---|---|---|
| 4,867,603 A * | 9/1989 | Chang | A01G 25/16 |
| | | | 405/37 |
| 7,017,837 B2 | 3/2006 | Taketomi et al. | |
| 8,308,079 B2 | 11/2012 | Grether et al. | |
| 2012/0018661 A1 | 1/2012 | Kao et al. | |
| 2016/0186871 A1* | 6/2016 | Chen | F16K 15/148 |
| | | | 137/516.11 |
| 2016/0222639 A1 | 8/2016 | Stein | |

FOREIGN PATENT DOCUMENTS

| | | |
|---|---|---|
| DE | 4436193 | 4/1996 |
| DE | 29702063 | 3/1997 |
| DE | 29703335 | 4/1997 |
| DE | 29902906 | 5/1999 |
| DE | 102006057795 | 2/2008 |
| DE | 212010000204 | 1/2013 |
| DE | 202015000856 | 6/2016 |
| FR | 717041 | 12/1931 |
| JP | S58139443 | 9/1983 |
| WO | 03040481 | 5/2003 |

* cited by examiner

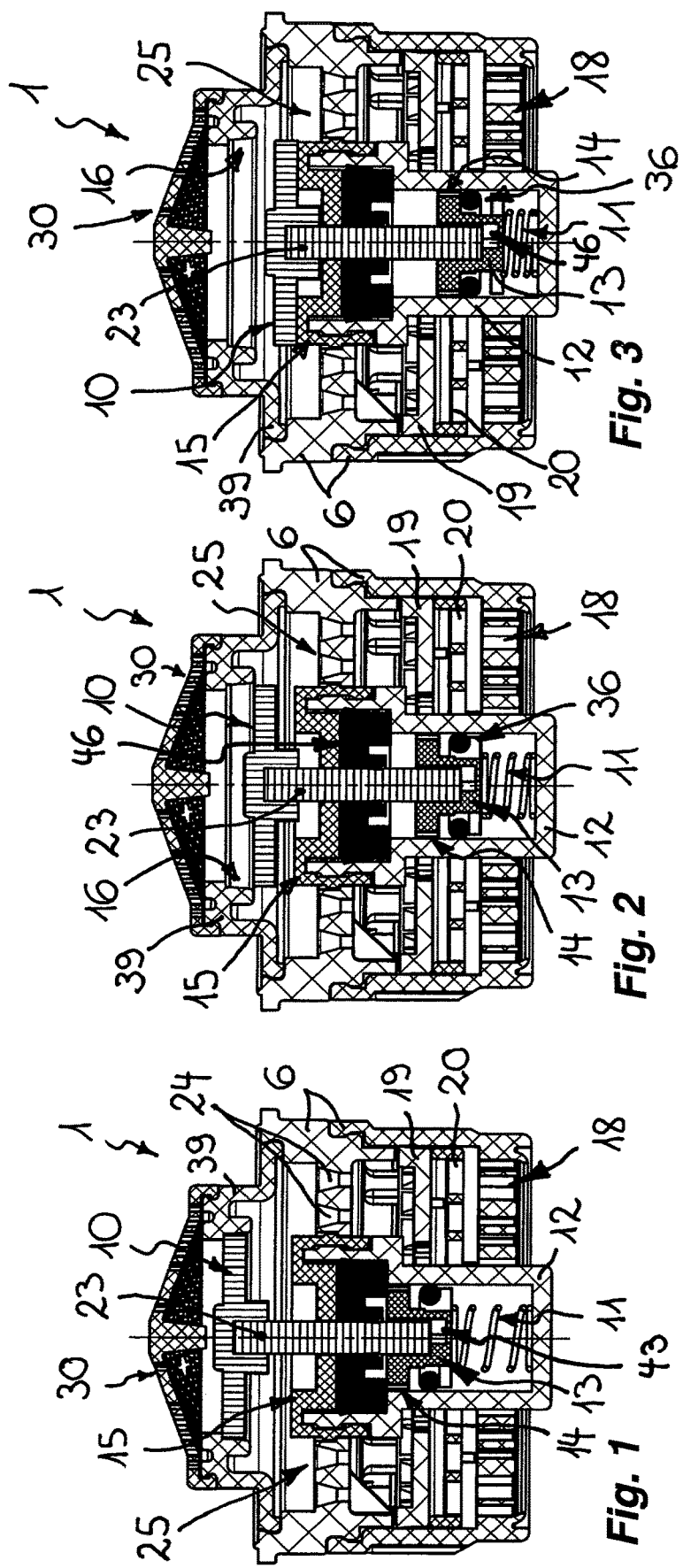

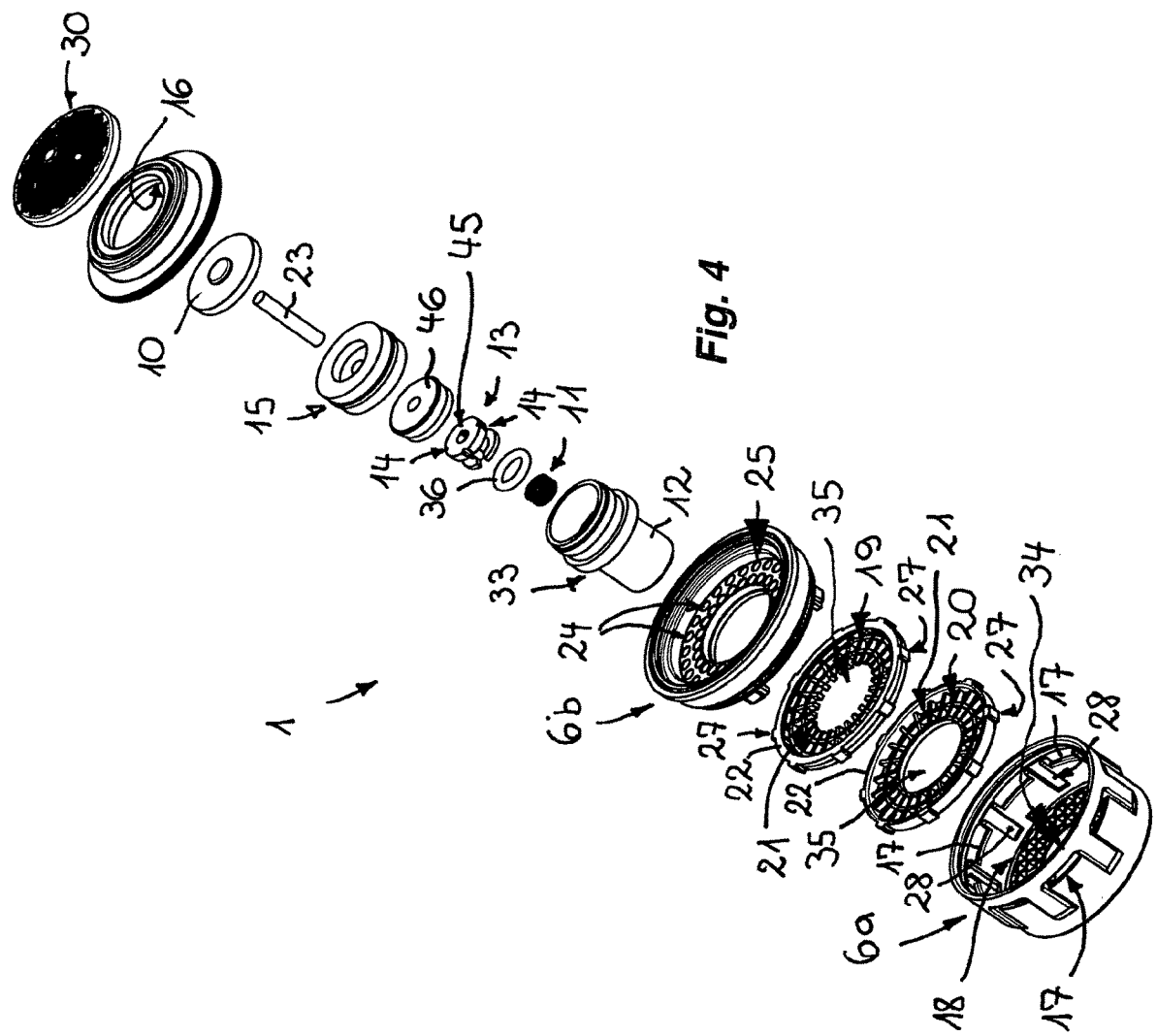

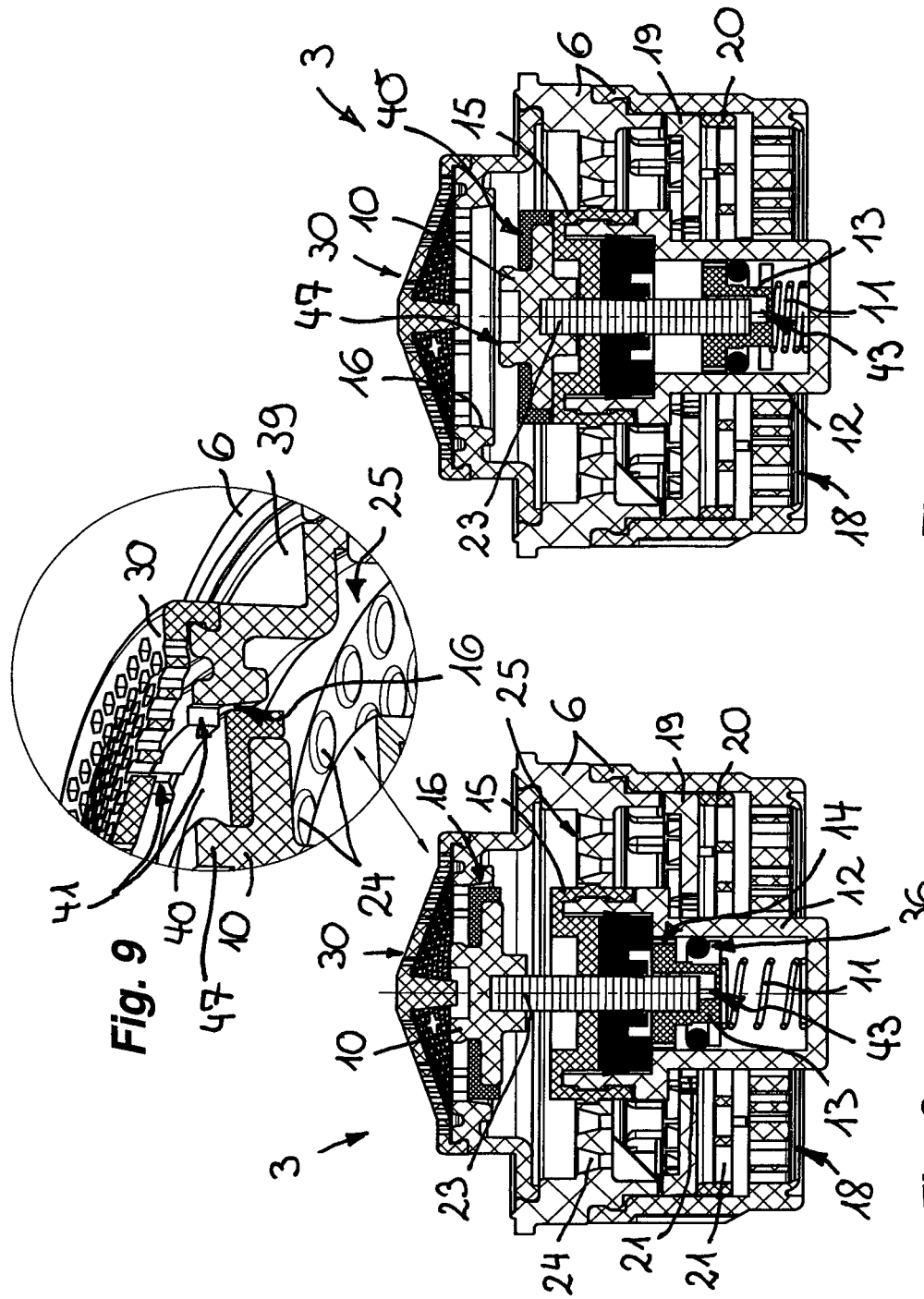

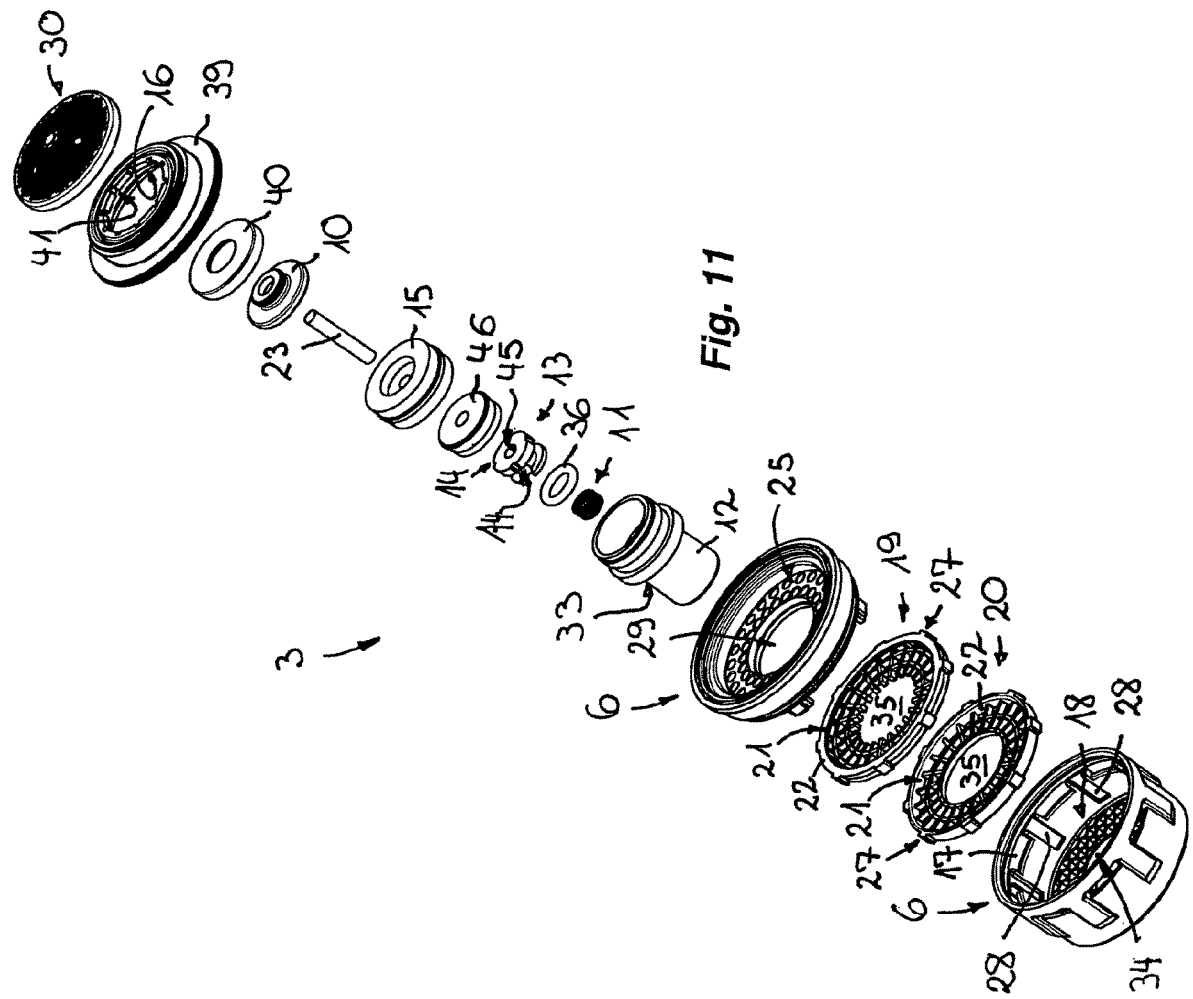

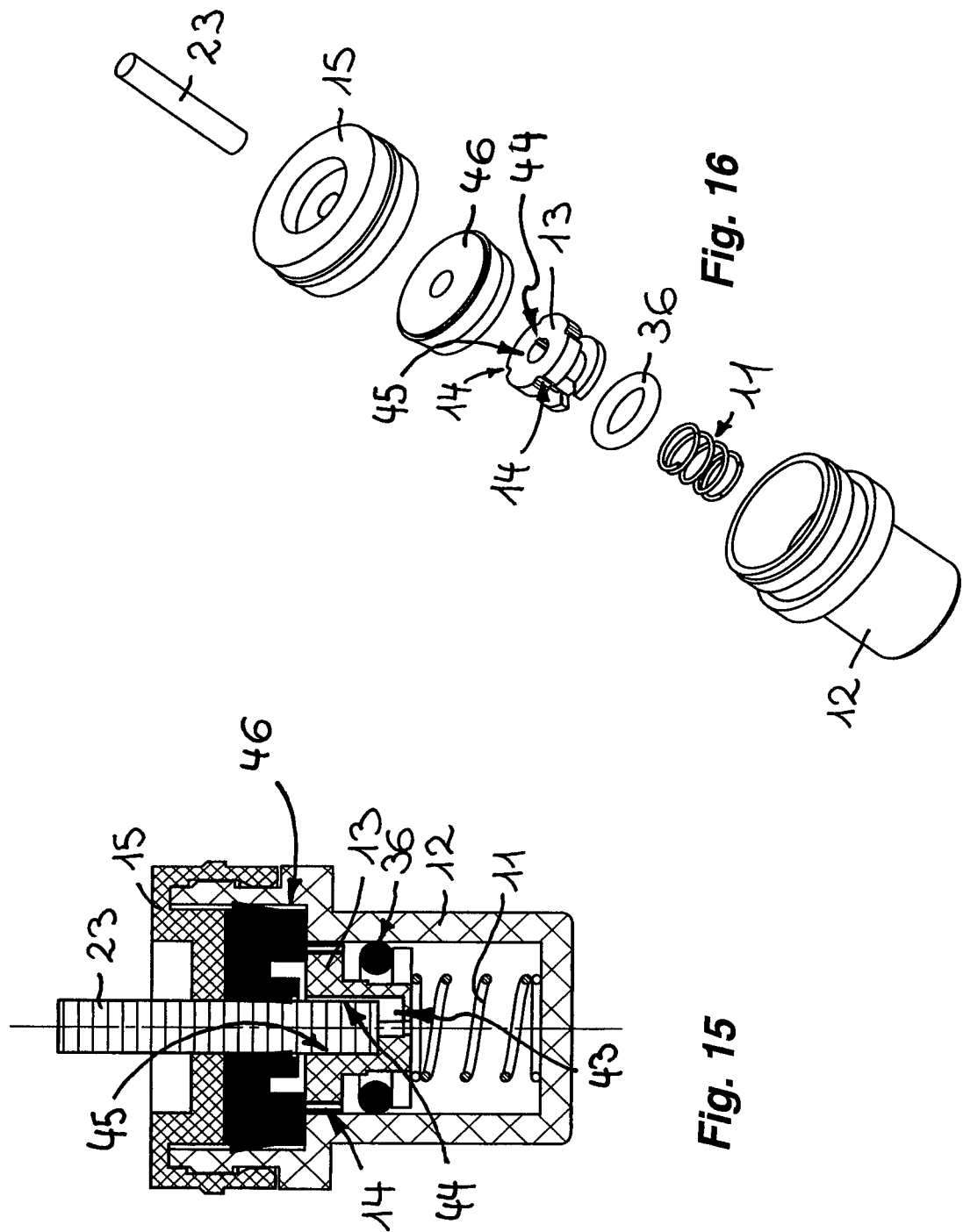

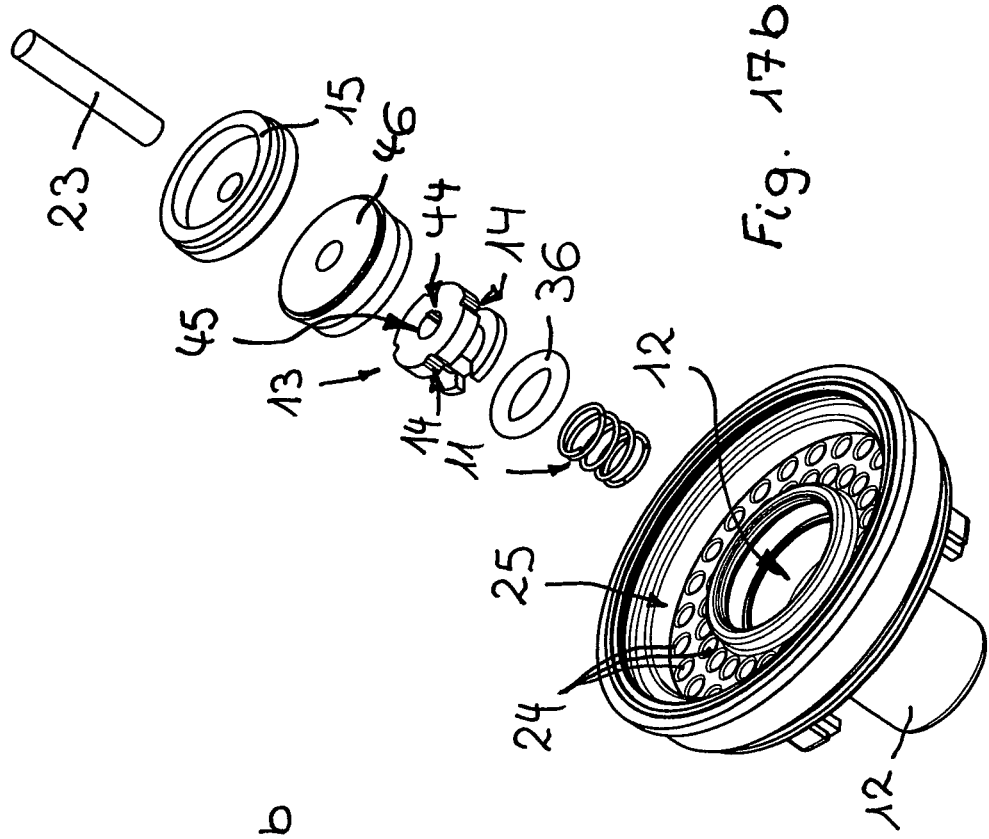
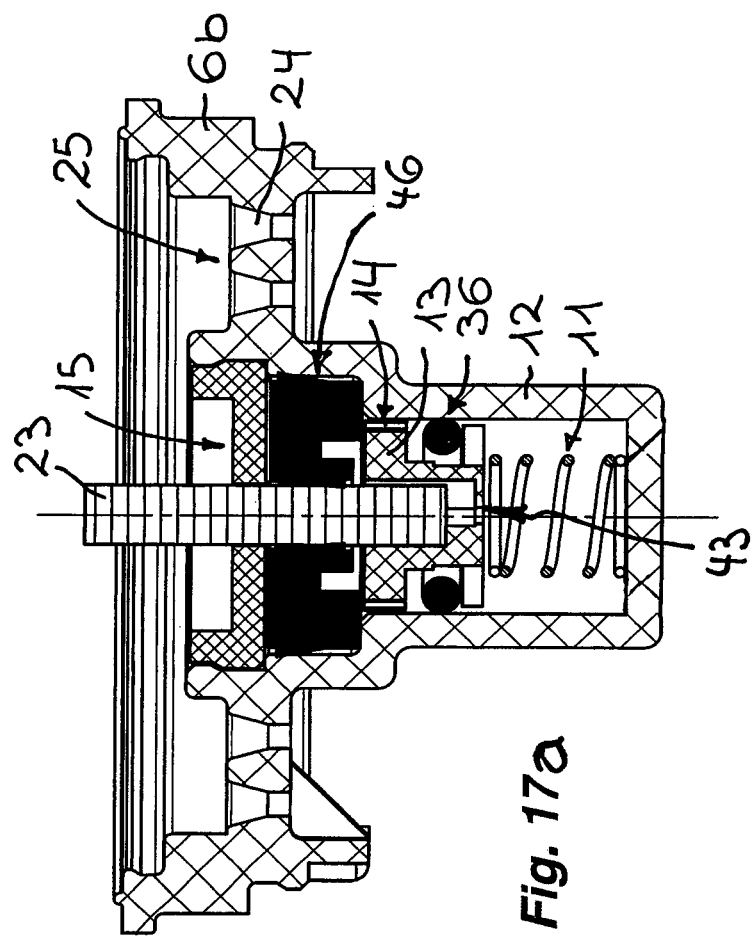

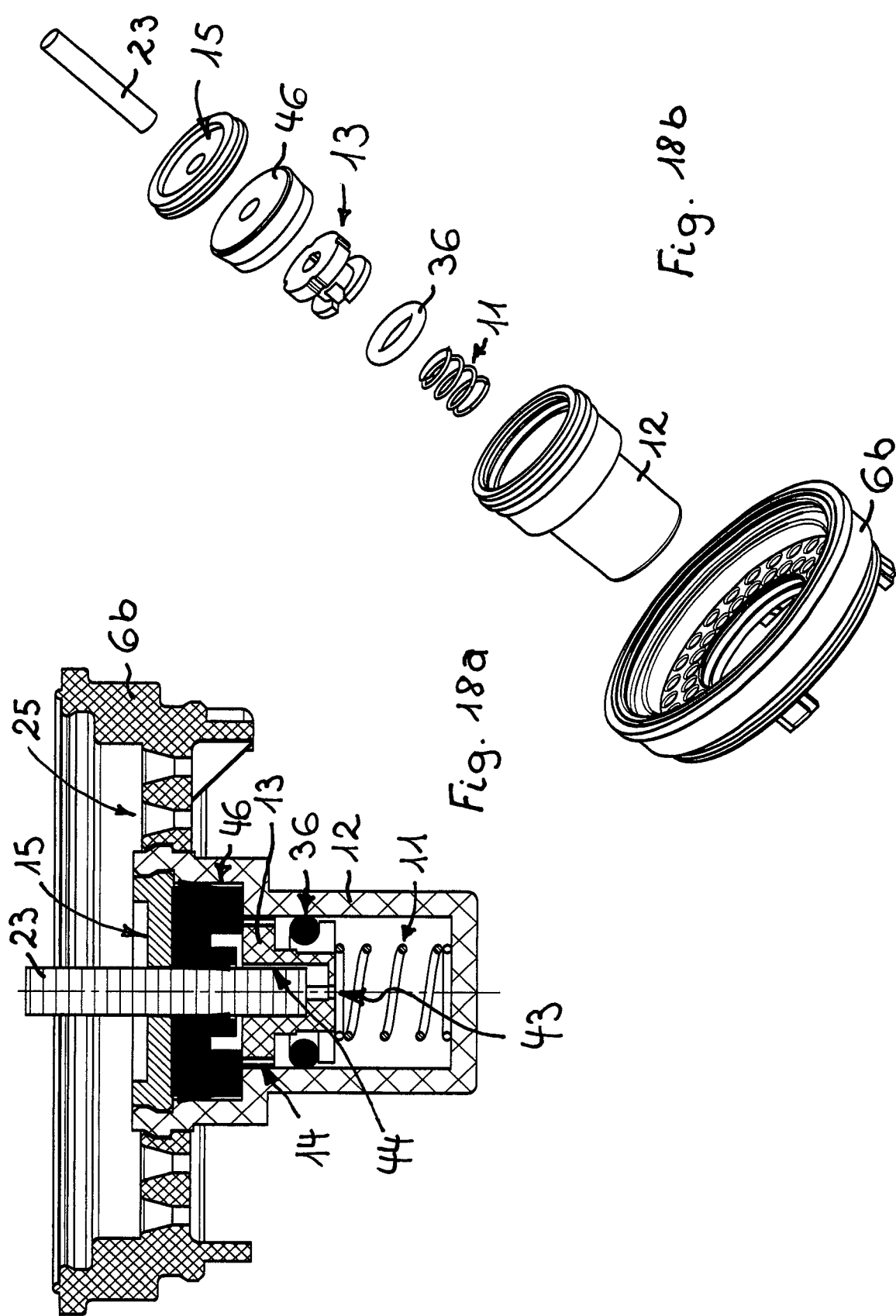

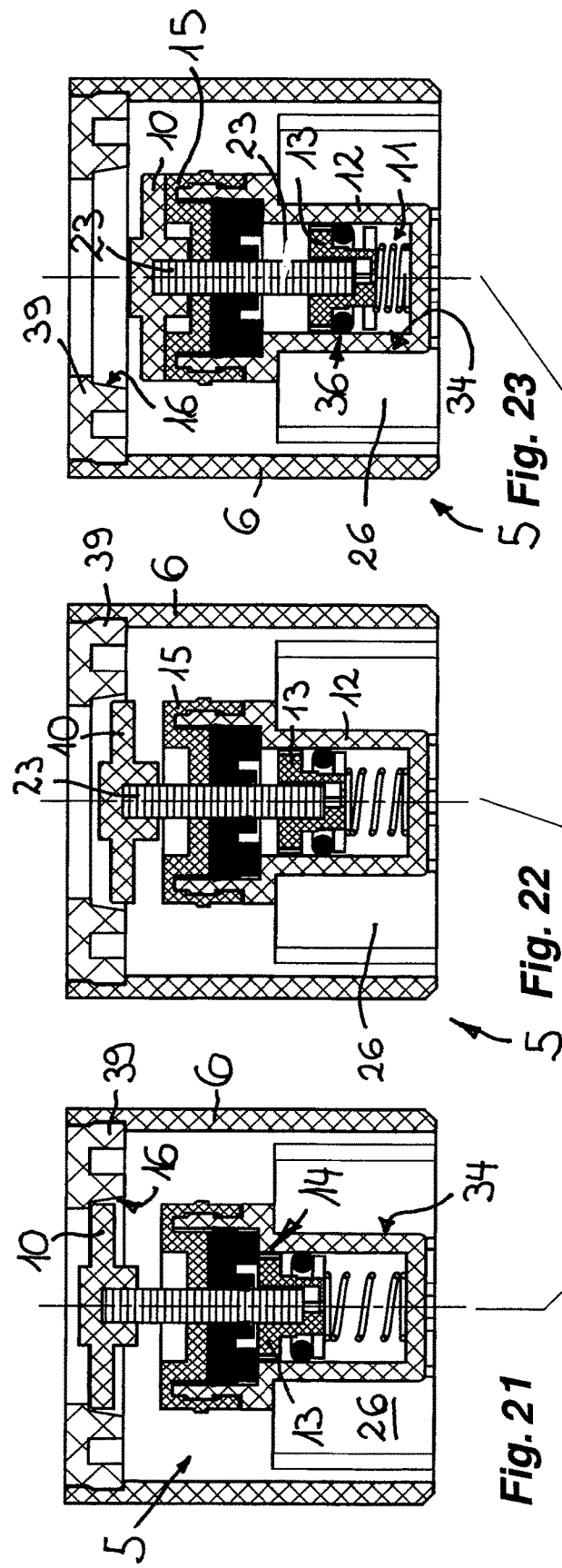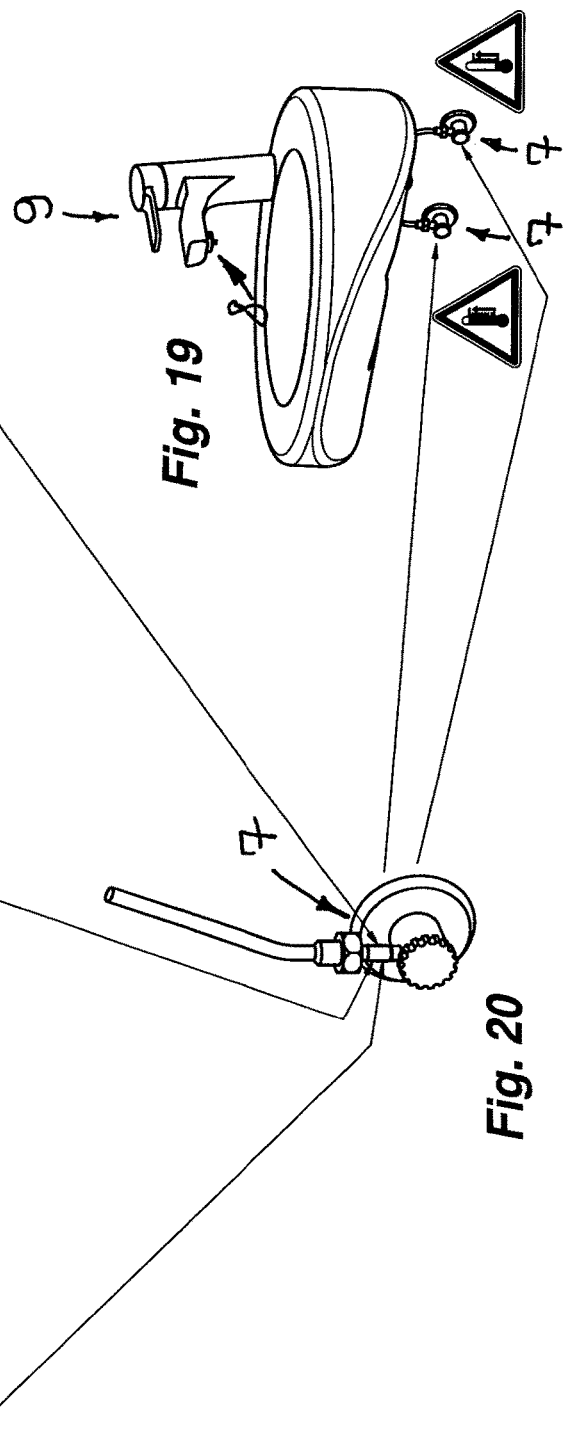

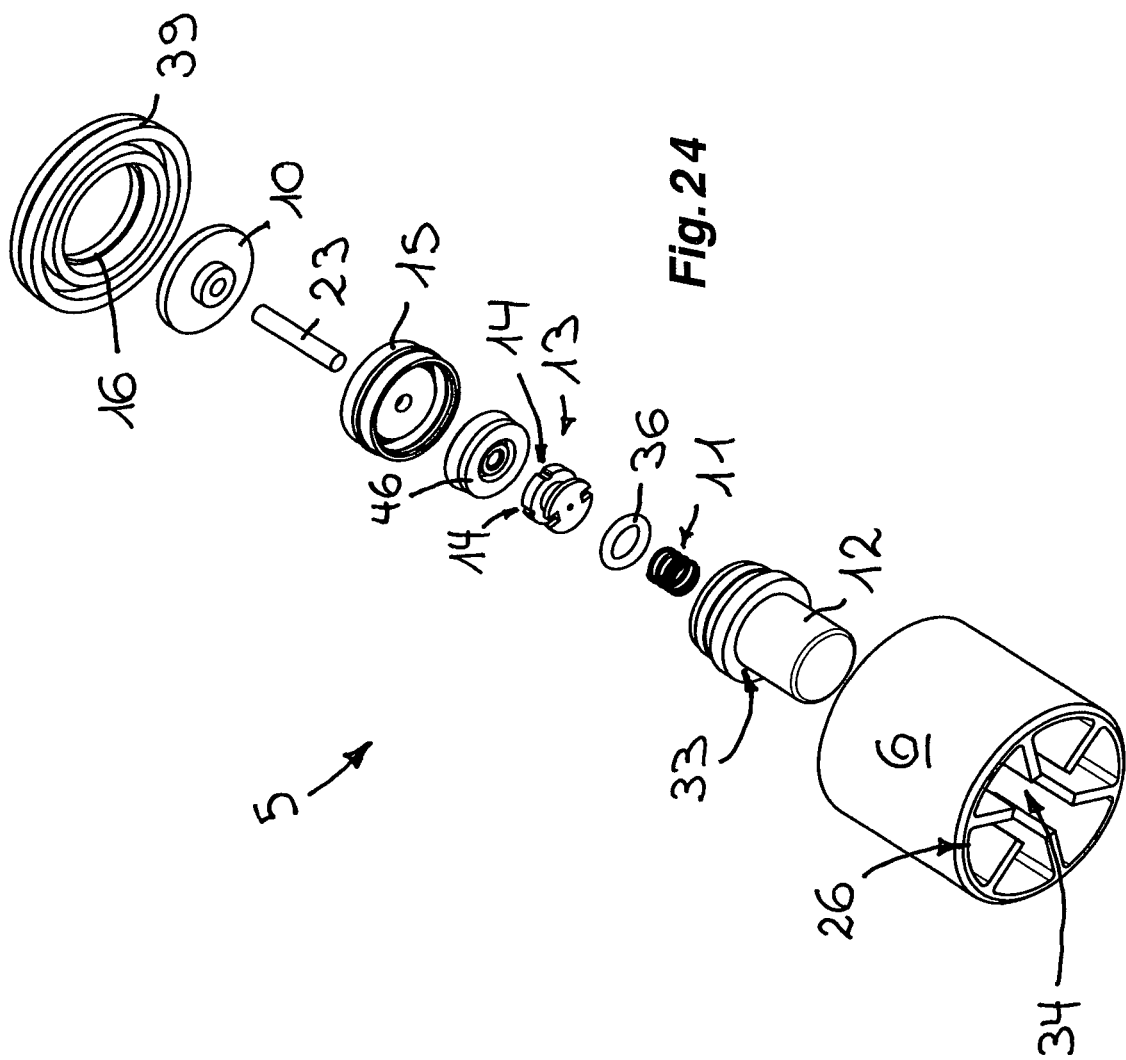

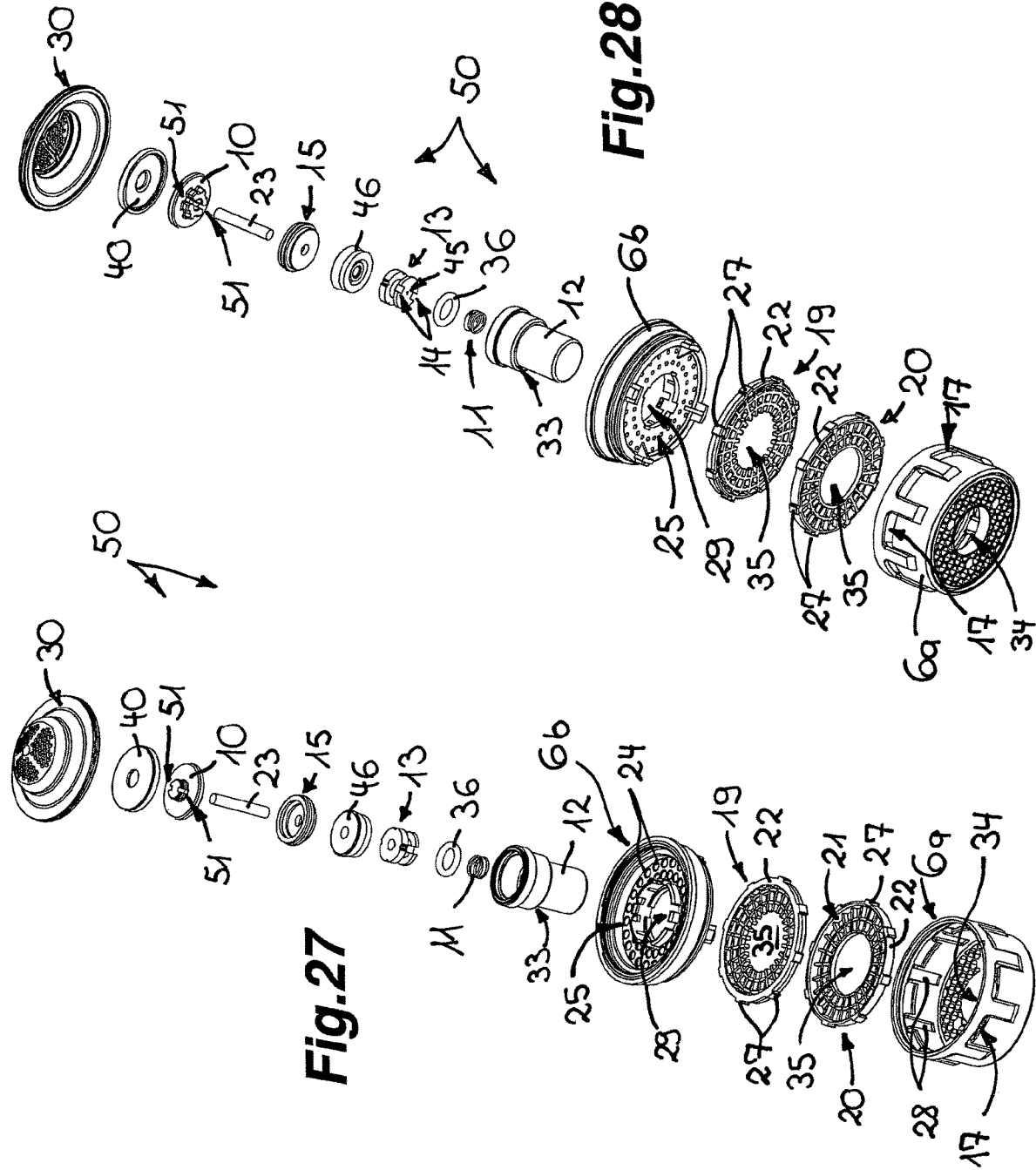

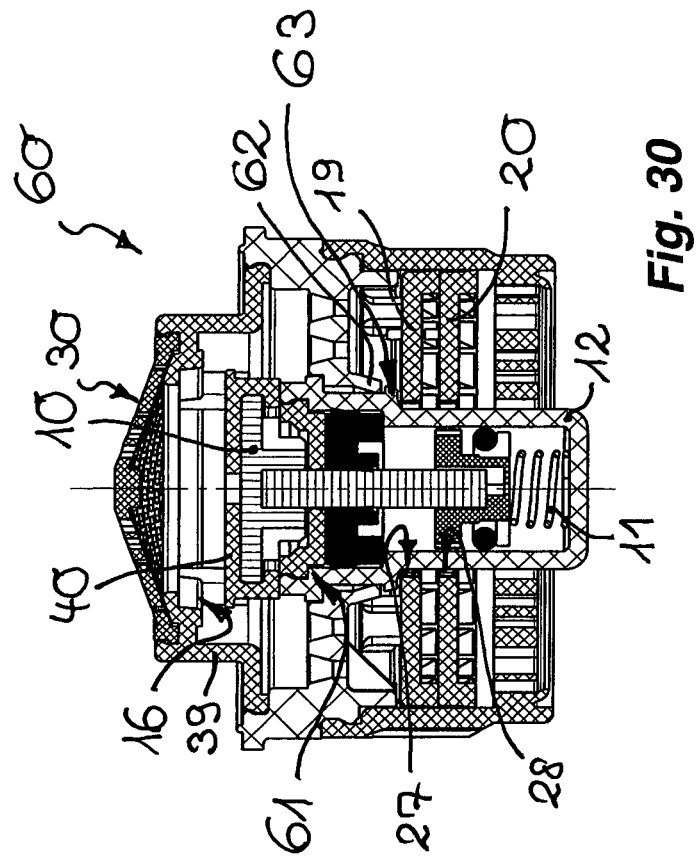
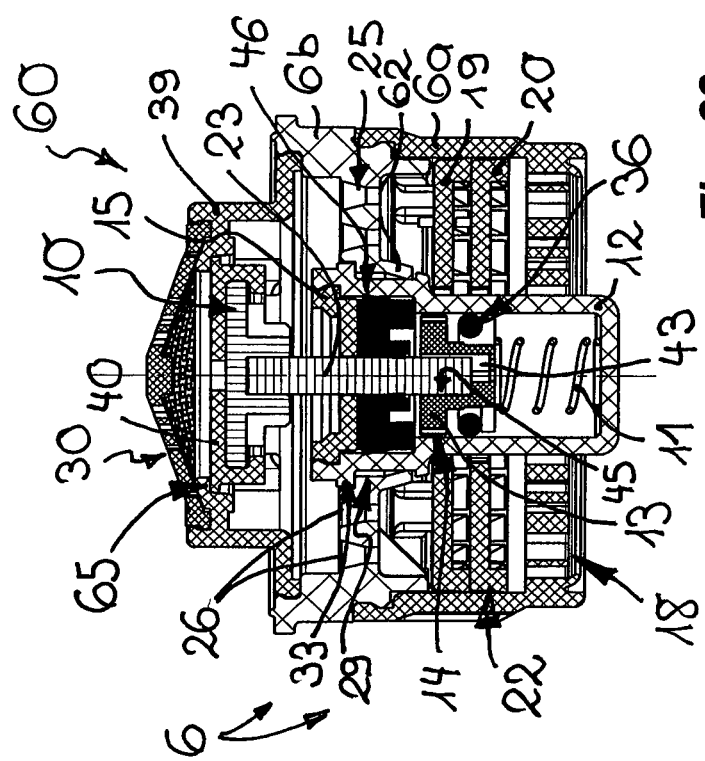

SANITARY INSERTION UNIT

BACKGROUND

The invention relates to a sanitary insert unit having an insert housing, in which insert housing a valve having a valve piston is provided, which valve piston is guided in a displaceable manner in the insert housing and is movable from a rest position, under the pressure of the inflowing water, counter to the restoring force of at least one restoring element, wherein the insert unit has at least one movement damper, which damps or brakes the movement of the valve piston from the rest position into the open position.

The invention also deals with the use of such a sanitary insert unit.

Sanitary insert units are already known in various embodiments for different applications. Thus, insert units have already been created, which serve as backflow preventers in order to prevent a flow of water, which is flowing back counter to the flow-through direction and is possibly contaminated with pollutants, from passing back into the pipe network. These insert units in the form of backflow preventers have an insert housing which can be mounted between two pipe sections and in which a valve having a valve piston is provided. This valve piston is guided in a displaceable manner in the insert housing and is movable from a rest position, during which no water flows through the pipe network, under the pressure of the water flowing in following the opening of the fitting, counter to the restoring force of at least one restoring element, such that the water can flow through in the normal flow-through direction.

A sanitary insert unit of the type mentioned at the beginning is already known from DE 26 50 934 A1, said sanitary insert unit being intended to be installed in the drainage connector of a pipe disconnector, said drainage connector leading to a water consumption point, in order, in the open position of the pipe disconnector, that is to say with the piston tube thereof extended out of the drainage connector and thus with the drinking water feed pipe completely separated from the consumption point, to close the drainage connector in a liquid-tight manner, in order to prevent sanitary water that is not infrequently contaminated with added chemicals or the like and is standing in the consumption-point pipe system from flowing back or out. The previously known insert unit has, to this end, an insert housing, in which a valve having a valve piston is provided, which valve piston is guided in a displaceable manner in the insert housing and is movable from a rest position, under the pressure of the inflowing water, counter to the restoring force of at least one restoring element. In order, in spite of the fresh water flowing past the valve piston, to guide this valve piston securely without flapping and rotary vibrations, in order to damp the sliding movement of the valve piston from the rest position into the open position, a movement damper is provided, which is in the form of an outwardly leading pressure equalization and damping bore. The previously known insert unit is not intended to allow the volume of water emerging from a water outlet to build gently even when the water pipe is opened abruptly, and nor is it suitable therefor.

Many outlet fittings are in the form of single-lever fittings, in which an operating lever for opening and closing the flow of water can be pivoted and, in order to mix hot and cold water, rotated. In particular in such outlet fittings too, the problem frequently arises that the outlet fitting is opened so quickly, and possibly unintentionally, that a strong surge of water strikes the washbasin and sprays in an uncontrolled manner there and can also hit the user themselves.

SUMMARY

Therefore, the object is in particular to create a sanitary insert unit of the type mentioned at the beginning, which creates a gently building flow of water even when the water pipe is opened abruptly.

In the case of the sanitary insert unit of the type mentioned at the beginning, this object is achieved according to the invention in particular in that the at least one movement damper is configured as a hydraulic damper which has a damper housing, in which damper housing a damper piston is guided in a displaceable manner, wherein, during a sliding movement from the rest position into the open position, the damper piston displaces oil or similar viscous fluid from one side of the damper piston to the other side of the damper piston through at least one connecting duct.

The insert unit according to the invention has an insert housing, which can be mounted in the water outlet of a sanitary outlet fitting or between two pipe sections of a water pipe, for example can be inserted in a corner valve or connection valve. In this case, the insert unit is intended to create a gently building flow of water when an outlet valve provided in the water pipe is opened abruptly. To this end, a valve having a valve piston is provided in the insert housing of the insert unit, said valve piston being movable from a rest position, under the pressure of the water flowing in against the insert unit and the valve piston thereof, counter to the restoring force of at least one restoring element. In this case, the rest position can be configured as the closed position of the valve or be in the form of a flow-through position which affords a reduced flow cross section compared with the open position. The damper housing, which is arranged in the insert housing and around which the water flowing through the insert housing flows, at least in the open position, is a constituent part of a movement damper, which damps or brakes the sliding movement of the valve piston from the rest position into the open position such that the valve piston only slowly opens the flow-through of the water in the region of the insert unit and the flow of water accordingly builds only slowly even when the outlet valve is opened abruptly. To this end, according to the invention, the at least one movement damper is configured as a hydraulic damper which has a damper housing, in which damper housing a damper piston is guided in a displaceable manner, wherein, during a sliding movement from the rest position into the open position, the damper piston displaces oil or similar viscous fluid from one side of the damper piston to the other side of the damper piston through at least one connecting duct. Such a restoring unit, which has a movement damper configured as a hydraulic damper, is able to damp or brake the sliding movement of the valve piston from the rest position into the open position particularly effectively.

In this case, the at least one restoring element can for example also be in the form of a rubber-elastic restoring element. However, in a particularly simple and long-lasting embodiment according to the invention, the at least one restoring element is in the form of a restoring spring.

In this case, a simple structure and easy mounting of the insert unit according to the invention are favored further when the at least one restoring element is in the form of a compression spring.

In order that the movement damper can brake this sliding movement of the valve piston as simply as possible, it is advantageous when the valve piston is connected to the damper piston in terms of movement via a piston rod. To this end, it is expedient when the piston rod is connected to the valve piston at its first rod end oriented counter to the direction of flow, and is connected to the damper piston at its second rod end directed in the direction of flow.

In order to move the damper piston from the open position back into the rest position again and in order in the process to again be able to displace the oil or similar viscous fluid from one side of the damper piston to the other side of the damper piston through the at least one connecting duct, it is advantageous when the at least one restoring element applies pressure to that end side of the damper piston that faces away from the flow-through direction of the insert unit.

In this case, in a particularly simple embodiment according to the invention, the at least one restoring element is arranged between a closed housing bottom of the damper housing and that end side of the damper piston that faces away from the flow-through direction.

In order to be able to mount the movement damper easily, it is expedient when the damper housing has an end-side housing opening, which is closed by at least one cover in the form of an annular disk, the annular-disk opening of which has the piston rod passing through it.

Additionally or alternatively, it may be advantageous when the damper housing is sealed off from the insert housing by a plug in the form of an annular disk, the annular-disk opening of which has the piston rod passing through it.

This plug can have been introduced into the damper housing and be held in a releasable manner on the housing inner circumference of the damper housing. In addition, it is possible for the plug to be held or secured in the damper housing by the cover in the form of an annular disk.

It is advantageous when this plug provides sealing between the housing inner circumference of the damper housing and the piston rod passing through the annular-disk opening thereof, such that the damper housing, which is subdivided into two housing portions by the damper piston, is closed off tightly from the external housing interior of the insert housing.

In order to allow the volume of water flowing through per unit time to build as slowly as possible after the outlet valve has been opened, it is advantageous when, in the rest position, the valve piston of the valve butts preferably partially or with play against a circumferential rim in the insert housing, said circumferential rim being in the form of a valve seat and bounding a flow-through opening. If the valve piston of the valve butts only partially or only with play against the valve seat, a small water quantity can already flow between the valve piston and the valve seat thereof in the rest position and abrupt separation of the valve piston from the valve seat is avoided.

By contrast, the valve piston of the valve is spaced apart, in the open position thereof, from the circumferential rim, in the form of a valve seat, in the insert housing.

It is possible for the sanitary insert unit to be in the form of an unaerated jet former or of a jet aerator, which jet aerator mixes the water flowing through with ambient air during use.

If the insert unit according to the invention is in the form of a jet aerator, it is advantageous when this jet aerator has a jet splitter, which divides the water flowing through into a multiplicity of individual jets during use. Such a jet splitter can be in the form for example of a perforated plate, which has a multiplicity of flow-through holes that form individual jets.

In order that ambient air can be drawn into the housing interior of the insert housing of an insert unit in the form of a jet aerator, said ambient air subsequently being intended to be mixed therein with the water flowing through in a mixing zone, it is expedient when, in the circumferential wall of the insert housing, at least one aeration opening opens out, which is provided in an annular zone of the circumferential wall, said annular zone being arranged preferably directly beneath the jet splitter in the direction of flow. This is because the flow-through holes provided in the jet splitter constrict the flow cross section of the insert unit according to the invention in this region such that a negative pressure arises on the outflow side of the jet splitter according to Bernoulli's equation. With the aid of this negative pressure, ambient air can be drawn into the interior of the insert housing via the at least one aeration opening, said ambient air subsequently being mixed, in the mixing zone arranged on the outflow side of the jet splitter, with the individual jets formed in the jet splitter.

In order that the individual jets mixed with ambient air in the interior of the insert housing are formed into a homogeneously emerging and as far as possible non-spraying outlet jet again, it is advantageous when the jet aerator has an outflow-side flow straightener having a honeycomb, lattice or mesh structure, which honeycomb, lattice or mesh structure is formed by webs that intersect at intersecting points.

In this case, the vandalism-resistant function of the insert part according to the invention is ensured and pushing up of the flow straightener and the insert parts that follow counter to the direction of flow is avoided when the honeycomb, lattice or mesh structure of the flow straightener is integrally formed on the insert housing.

In order to be also subsequently able to additionally divide the individual jets created in the jet splitter and to mix them readily with the ambient air drawn into the insert housing, it is advantageous when, between the jet splitter and the flow straightener, at least one insert part having a lattice or mesh structure made up of webs that intersect at intersecting points is provided.

The lattice or mesh structures of the insert parts located one above another can be positioned at a fixed spacing from one another when the at least one insert part has, at least on its outer circumference, an encircling annular wall, on which annular wall the lattice or mesh structure of this insert part is integrally formed. In this case, the annular wall of each insert part is dimensioned such that the spacing of the lattice or mesh structures integrally formed on these annular walls is fixed.

In a particularly simple and easy to produce embodiment according to the invention, the damper housing is releasably connectable or integrally connected to the jet splitter.

In an advantageous embodiment according to the invention, the damper housing is held in a preferably central insertion opening of the jet splitter by a latching connection.

In order to be able to accommodate the constituent parts of a movement damper in a damper housing of sufficiently large dimensions, it is advantageous when the jet splitter and preferably also the flow straightener and optionally also the at least one insert part provided between the jet splitter and flow straightener each have an insertion opening, which insertion opening(s) has/have the damper housing passing through it/them.

In a preferred development according to the invention, during a sliding movement during use, the damper piston displaces oil or similar viscous fluid through at least one connecting duct from the rest position into the open position and through at least one return-flow duct from the open position into the rest position. In such an embodiment, the pressure stage of the movement damper for the one part and the rebound stage thereof for the other part can also easily be configured differently.

In order to be able to fasten a damper housing that is releasable from the jet splitter sufficiently firmly to the jet splitter in the use position of the insert part, it is advantageous when an insertion stop is provided on the outer circumference of the damper housing, and when the damper housing is insertable into the insertion opening in the jet splitter until the insertion stop butts against a mating stop on the jet splitter.

In order to be able to displace the oil or similar viscous fluid located in the damper housing easily from one side of the damper piston to the other side of the damper piston, it is expedient when the damper piston has, on its outer circumference, at least one circumferentially open groove, which bounds the at least one return-flow duct together with the housing inner circumference of the damper housing. In this embodiment, it is possible to dispense with small and possibly easily soiled flow-through bores or return-flow ducts in the damper piston.

It is advantageous when the at least one connecting duct has, on the inflow side, a duct inlet, which is arranged on that piston end side of the damper piston that faces the housing bottom of the damper housing.

In a preferred embodiment according to the invention, the at least one connecting duct has, on the outflow side, a duct portion which is provided preferably in a groove-like indentation between the piston rod and an inner circumferential wall, which inner circumferential wall bounds a plug-in opening in the damper piston, said plug-in opening accommodating one rod end of the piston rod.

It is advantageous when the movement damper has a pressure stage, which is active under the pressure of the inflowing water and during which the valve moves from its rest position into the open position, and a rebound stage, during which a restoring movement of the damper piston from the open position into the rest position of the valve takes place.

In order that the emerging volume of water builds sufficiently slowly when the outlet valve is opened, it is advantageous when the pressure stage of the movement damper is configured to be harder than the rebound stage.

To this end, in a preferred embodiment according to the invention, a ring seal is provided on that end side of the damper piston that faces away from the direction of flow, said ring seal closing the at least one return-flow duct during a sliding movement of the damper piston from the rest position into the open position. This ensures that, during such a sliding movement, the fluid can be displaced by the damper piston only through the at least one connecting duct and that the movement damper can easily be configured in an appropriate way in this pressure stage.

In order to prevent troublesome noises that are audible to the user during the sliding movement of the damper piston, it is advantageous when the valve piston bears a surface layer made of elastic material, at least in the annular zone butting against the valve seat in the rest position.

In order to provide the valve piston with such a surface layer made of elastic material, it is advantageous when the valve piston bears a surface layer made of elastic material on its end side facing the valve seat, said surface layer being mounted on the valve piston so as to be displaceable in a radial direction. Since, in this developing embodiment, the surface layer is mounted on the valve piston so as to be displaceable in a radial direction, the surface layer, which consists of an elastic, but incompressible material, is pressed together by the pressure of the inflowing water and displaced outwardly in a radial direction toward the valve seat, such that even briefly audible troublesome noises during the sliding movement of the valve piston from the rest position into the open position are counteracted.

In this case, the surface layer can be configured in the form of an annular disk, wherein the annular-disk opening in this surface layer has a peg, protruding from the valve piston, passing through it.

By contrast, however, it is also possible and advantageous when at least one plug-in peg is integrally formed on the flat side, facing the valve piston, of the surface layer, which plug-in peg is held in an associated peg opening in the valve piston.

Since such an elastic surface layer can result in excessive and function-imp airing sealing off of the insert part in the narrow region between the valve piston, surface layer, valve seat and an optionally upstream dome screen or filter screen, it is expedient when the circumferential rim, in the form of a valve seat, in the insert housing has at least one peripheral indentation, which indentation is water-permeable even in the rest position of the valve.

In order to prevent audible troublesome noises during the sliding movement of the valve piston, it can additionally or alternatively be advantageous when the valve piston, on its circumferential rim facing the valve seat, bears a chamfer or has a rounded piston rim. This rounded piston rim or the chamfer can be formed directly on the valve piston or its surface layer borne thereby.

The valve piston and its elastic surface layer can optionally also be produced as multi-component injection-moldings. However, in a simple embodiment according to the invention that is associated with comparatively little production outlay, the valve piston and the elastic surface layer are produced as separate components which are mounted on one another only after they have been produced. In order that the elastic surface layer is held securely and firmly on the valve piston in the mounted state, in a preferred embodiment according to the invention, the surface layer engages with its circumferential-rim region behind the valve piston and in particular behind a subregion, protruding in a flange-like manner, of the valve piston.

In order to guide the valve piston with as little frictional resistance as possible during its adjusting or sliding movement and in order to avoid undesired squeaking noises during the sliding or adjusting movement of the valve piston, it is advantageous when guide ribs are provided on the outflow side of the valve seat, said guide ribs each forming a linear piston guide for the valve piston during the sliding movement of the valve piston.

In order in this case to be able to guide the valve piston particularly well without increasing the sliding resistance, it is advantageous when the surface layer has a circumferentially protruding annular flange, and when the guide ribs impinge on this annular flange of the surface layer.

In an advantageous use of the sanitary insert unit described above, the sanitary insert unit is interposed in a corner valve or connection valve of a sanitary water pipe.

By contrast, however, in a preferred further use according to the invention of the sanitary insert unit described above, the sanitary insert unit is mounted in the water outlet of a sanitary outlet fitting. Such an insert unit can also be substituted subsequently for a commercially customary jet regulator, in that, instead of this commercially customary jet regulator, the insert unit according to the invention is now inserted into the outlet mouthpiece, which outlet mouthpiece can subsequently be mounted by way of an internal or external thread on a complementary mating thread on the water outlet of the sanitary outlet fitting.

BRIEF DESCRIPTION OF THE DRAWINGS

Developments according to the invention can be gathered from the claims in conjunction with the description and the drawings. In the following text, the invention is described in more detail with reference to preferred exemplary embodiments.

In the drawings:

FIG. 1 shows an insert unit, which is in the form of a jet aerator and is shown here in longitudinal section, having an insert housing, in which insert housing a valve is provided, which has a valve piston guided in a displaceable manner in the insert housing, wherein the sliding movement of the valve piston from the rest position, shown here, of the valve into an open position is braked or damped with the aid of a movement damper, FIG. 2 shows the insert unit, which is likewise shown in longitudinal section here, in an intermediate position between the rest position and an open position of the valve, FIG. 3 shows the insert unit, likewise in longitudinal section here, in the open position of the valve located in the insert housing, FIG. 4 shows the insert unit from FIGS. 1 to 3 in an exploded perspective illustration of its constituent parts, FIG. 8 shows an insert unit likewise formed as a jet aerator here and shown in longitudinal section, which insert unit has, in its insert housing, a valve having a valve piston which bears, on its flat side facing a valve seat, a surface layer, formed here in an annular manner, made of elastic material, wherein the valve is shown in its rest position here, FIG. 9 shows the insert unit from FIG. 8 in a detail illustration in longitudinal section in the region of the valve piston butting against the valve seat in the rest position, FIG. 10 shows the insert unit from FIGS. 8 and 9, likewise in longitudinal section, wherein the valve is in the open position here, FIG. 11 shows the insert unit from FIGS. 8 to 10 in an exploded perspective illustration of its constituent parts, FIG. 15 shows a movement damper, used in the jet aerators according to FIGS. 1 to 14 in an at least similar design, said movement damper having a restoring spring as restoring element, FIG. 16 shows the unit, produced from the movement damper and restoring spring, from FIG. 15 in an exploded perspective illustration of its constituent parts, FIG. 17A shows a jet splitter in longitudinal section for a jet aerator that is otherwise not shown further here, wherein the jet splitter shown here is connected integrally to the damper housing of a movement damper, FIG. 17B shows the unit, produced from the jet splitter and the integrally formed damper housing of the movement damper and the constituent parts thereof, from FIG. 17A in an exploded illustration of individual parts, FIG. 18A shows a jet splitter in longitudinal section for a jet aerator that is otherwise not shown further here, wherein the jet splitter shown here has a central insertion opening, into which the damper housing of a movement damper is inserted and is held securely by a latching or snap-fit connection, FIG. 18B shows the unit, produced from the jet splitter, separate damper housing of a movement damper and the further constituent parts of the movement damper, from FIG. 18A in an exploded illustration of individual parts, FIG. 19 shows an outlet fitting protruding above a wash basin, in the case of which the emerging water emerges in a slowly building flow of water after the outlet valve is opened, FIG. 20 shows one of the corner valves or connection valves leading to the outlet fitting according to FIG. 19, in which corner valve or connection valve an insert unit is likewise integrated, FIG. 21 shows the insert unit, mounted in the corner valve or connection valve according to FIG. 20, in longitudinal section in the rest position of its valve, FIG. 22 shows the insert unit from FIG. 21 in an intermediate position of the valve, FIG. 23 shows the insert unit from FIGS. 21 and 22 in the open position of the valve, FIG. 24 shows the insert unit from FIGS. 21 to 23 in an exploded perspective illustration of its individual parts, FIG. 27 shows the insert unit from FIGS. 25 and 26 in an exploded perspective illustration of its constituent parts in a plan view on the inflow side of the insert unit, FIG. 28 shows the insert unit from FIGS. 25 to 27 in a perspective illustration of its constituent parts in a bottom view of the outflow side of this insert unit, FIG. 29 shows an embodiment, modified for example compared with the insert unit according to FIGS. 8 to 11, of an insert unit in the rest or the closed position of the valve provided in the insert housing of this insert unit, FIG. 30 shows the insert unit from FIG. 29 in the open position of the valve.

DETAILED DESCRIPTION

Figure 6:
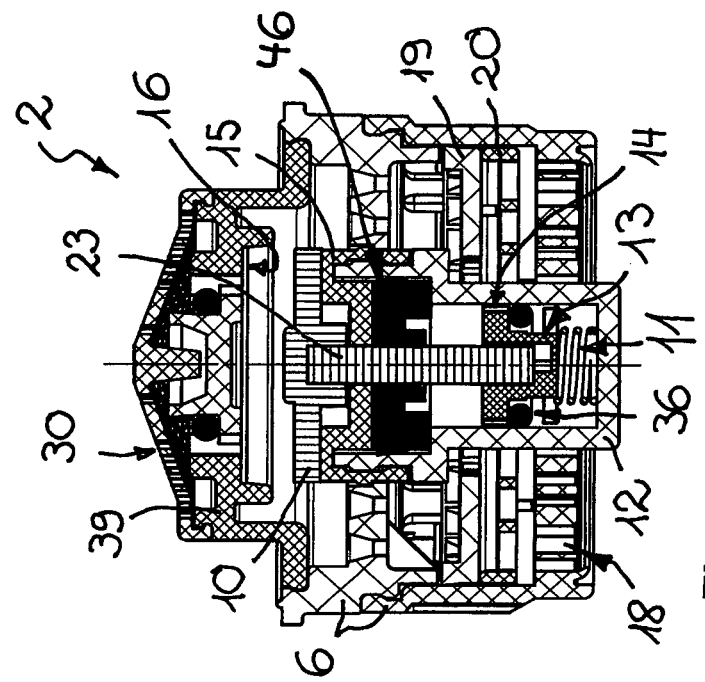
FIG. 6 shows the insert unit, already shown in FIG. 5, in longitudinal section, wherein the insert unit is in this case in the open position of the valve.
Figure 5:
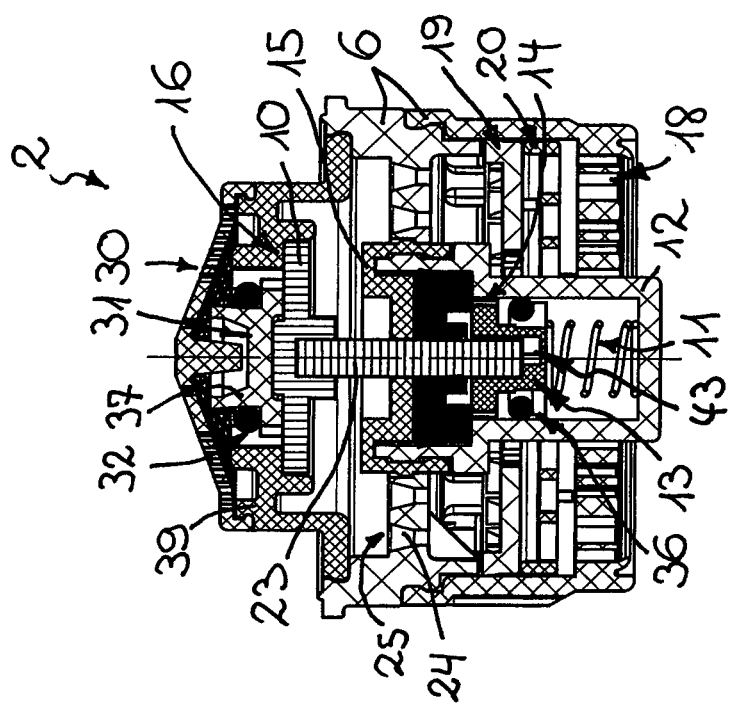
FIG. 5 shows an insert unit, which is likewise configured as a jet aerator here and is able to be mounted at the water outlet of a sanitary outlet fitting, in longitudinal section, wherein the valve provided in the insert housing of this insert unit is in its rest position and wherein a flow rate regulator is interposed in the insert housing of this insert unit, said flow rate regulator regulating and limiting the volume of water flowing through per unit time, independently of pressure, to a fixed maximum value.
Figure 7:
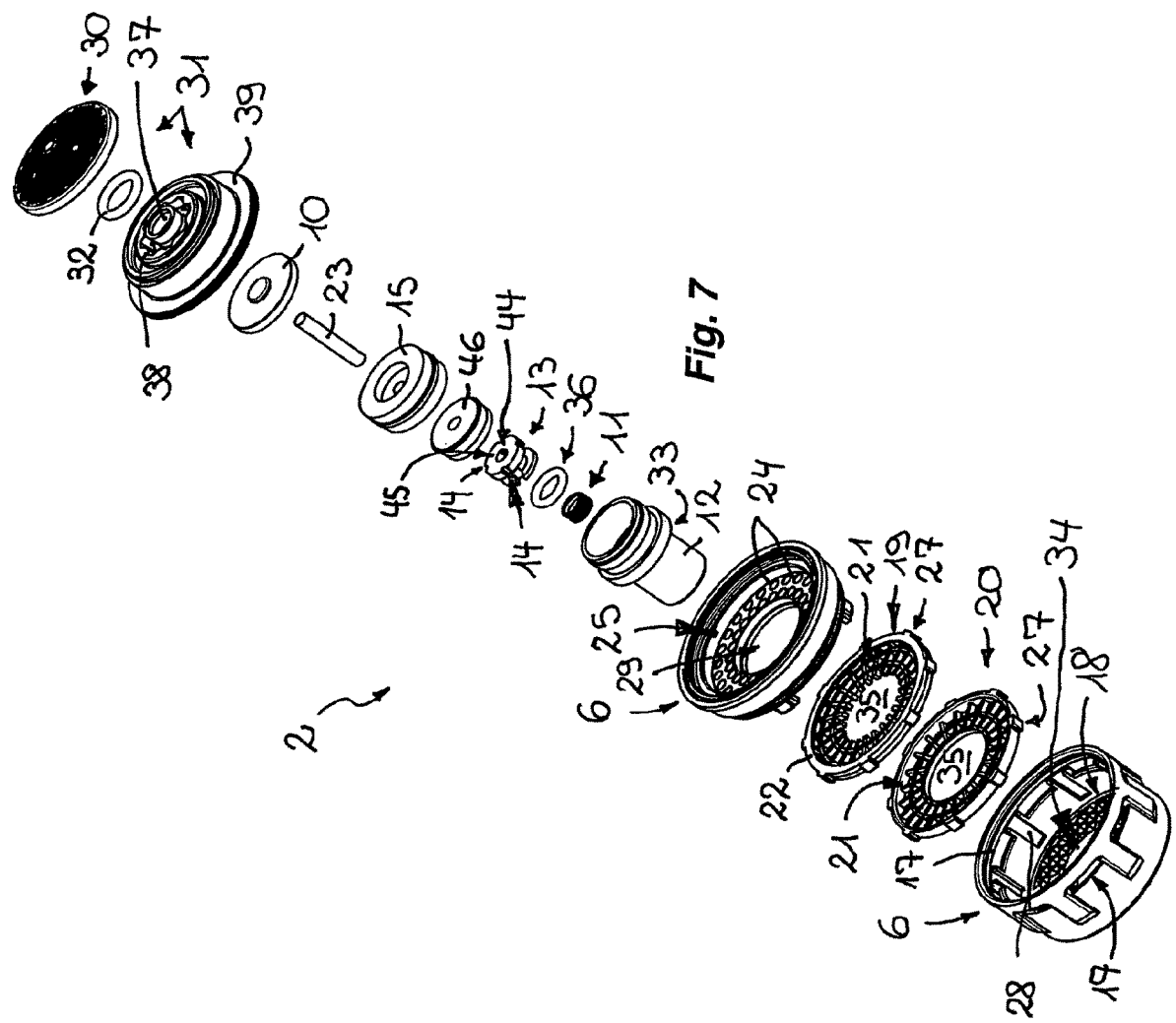
FIG. 7 shows the insert unit from FIGS. 5 and 6 in an exploded perspective illustration of its constituent parts.

FIGS. 1 to 14 and 21 to 30 illustrate a sanitary insert unit in different embodiments 1, 2, 3, 4, 5, 50 and 60. The insert unit 1, 2, 3, 4, 5, 50, 60 has an insert housing 6, which is formed in two parts here and has an outflow-side housing part 6a and an inflow-side housing part 6b (cf. FIG. 4). The insert housing 6 has been mounted in the water outlet 8 of a sanitary outlet fitting 9 (insert units according to FIGS. 1 to 14 and 25 to 30) or has been inserted between two pipe sections of a water pipe, for example in a corner valve or connection valve 7 (insert unit according to FIGS. 21 to 24). In this case, the insert unit 1, 2, 3, 4, 5, 50, 60 is intended to create a gently building flow of water even when an outlet valve provided in the water pipe is opened abruptly. To this end, a valve having a valve piston 10 is provided in the insert housing 6 of the insert units 1, 2, 3, 4, 5, 50, 60, said valve piston being movable from a rest position, under the pressure of the water flowing in against the insert units 1, 2, 3, 4, 5, 50, 60 and the valve pistons 10 thereof, counter to the restoring force of at least one restoring element. In this case, the rest position can be configured as a closed position of the valve or be in the form of a flow-through position, which affords a reduced flow cross section compared with the open position.

The restoring unit, which is arranged in the insert housing 6 and around which the water flowing through the insert housing 6 flushes at least in the open position, has, in addition to the at least one restoring element, at least one movement damper, which movement damper damps or brakes the movement of the valve piston 10 from the rest position into the open position such that the valve piston 10 only slowly opens the flow-through of the water in the region of the insert units 1, 2, 3, 4, 5, 50, 60 and the flow of water accordingly builds only slowly even when the outlet valve is opened abruptly.

The exemplary embodiments 1, 2, 3, 4, 5, 50, 60 shown in FIGS. 1 to 14 and 21 to 30 have, as restoring element, a compression spring 11, which is arranged in a damper housing 12 of the movement damper. In the damper housing 12, which is formed in a sleeve-like manner here, a damper piston 13 is guided in a displaceable manner. During its sliding movements in the damper housing 12, the damper piston 13 displaces a viscous fluid, preferably an oil and in particular a silicone oil which is compatible with drinking water, from one side of the damper piston 13 to the in each case other side of the damper piston 13. While the damper piston 13 displaces the fluid through at least one connecting duct 43 during a sliding movement from the rest position into the open position, this fluid flows, by contrast, through at least one return-flow duct during a sliding movement of the damper piston 13 from the open position into the rest position. On the inflow side, the connecting duct 43 has a duct inlet, which is arranged on that piston end side of the damper piston 13 that faces the housing bottom of the damper housing 12. On the outflow side, the connecting duct 43 has a duct section, which is provided in a groove-like indentation 44 between the piston rod 23 and an inner circumferential wall, which inner circumferential wall bounds a plug-in opening 45, accommodating one rod end of the piston rod 23, in the damper piston 13. This groove-like indentation 44 is—as is indicated for example in FIG. 18b—provided in the damper piston 13 here.

On its outer circumference, the damper piston 13 has at least one circumferentially open groove 14, which bounds the at least one return-flow duct together with the housing inner circumference of the damper housing 12. On that end side of the damper piston 13 that faces away from the flow-through direction of the insert unit 1, 2, 3, 4, 5, 50, 60, a ring seal 36 is provided, which ring seal 36 closes the at least one return-flow duct during a sliding movement of the damper piston 13 from the rest position into the open position.

The valve piston 10 is connected to the damper piston 13 in terms of movement via a piston rod 23. At its first rod end oriented counter to the direction of flow, this piston rod 23 is connected to the valve piston 10, and is connected to the damper piston 13 at its second rod end facing in the direction of flow. The compression spring 11 serving as a restoring element applies pressure to that end side of the damper piston 13 that faces away from the flow-through direction of the insert units 1, 2, 3, 4, 5, 50, 60, and is arranged between this end side and the closed housing bottom of the in this case sleeve-like damper housing 12. On the end side facing away from the housing bottom, the damper housing 12 has an inflow-side housing opening, which is closed by a cover 15. The cover 15 is in the form of an annular disk and has an annular-disk opening, through which the piston rod 14 passes. The damper housing 12 is sealed off from the insert housing 6 by a plug in the form of an annular disk, the annular-disk opening of which likewise has the piston rod 23 passing through it. This plug 46 is introduced into the damper housing 12 and held in a releasable manner at the housing inner circumference of the damper housing 12. The plug 46 is secured in the damper housing 12 by the cover 15 in the form of an annular disk. In this case, the plug 46 provides sealing between the housing inner circumference of the damper housing 12 and the piston rod 23 passing through the annular-disk opening thereof, such that the viscous fluid located in the damper housing 12 cannot emerge unintentionally and be entrained by the flow of water flowing through.

The cover 15 is in the form of a cap here and, with a peripheral skirt zone, encloses the wall circumference, bounding the end-side opening, of the housing wall of the damper housing 12.

In the rest position, shown in FIGS. 1, 5, 8, 9, 12, 21, 25 and 29, of the exemplary embodiments 1, 2, 3, 4, 5, 50, 60, illustrated here, of the insert units, the valve piston 10 of the valve butts against a circumferential rim in the insert housing 6 in the rest position. By contrast, in the open position shown in FIGS. 3, 6, 10, 13, 23, 26, 30, the valve piston 10 is spaced apart from this circumferential rim, in the form of a valve seat 16, in the insert housing 6.

It is clear from FIG. 19 and a comparison of the exemplary embodiments 1, 2, 3, 4, 50, 60 shown in FIGS. 1 to 14 and 25 to 30, for the one part, and the exemplary embodiment 5 illustrated in FIGS. 21 to 24, for the other part, that—depending on the embodiment—the insert unit can be mounted for example in the water outlet 8 of a sanitary outlet fitting 9 or be interposed between two pipe sections of a water pipe, for example in a corner valve or connection valve 7.

The exemplary embodiments 1, 2, 3, 4, 50, 60 depicted in FIGS. 1 to 14 and 25 to 30 show an insert unit which is mounted in the water outlet 8 of the sanitary outlet fitting 9 (cf. FIG. 19) with the aid of an outlet mouthpiece. In this case, the insert unit, 1, 2, 3, 4, 50, 60 can be in the form of an unaerated jet former, which forms the water flowing out into a homogeneous and non-spraying water jet. The insert unit 1, 2, 3, 4, 50, 60, formed by contrast as a jet aerator here, according to FIGS. 1 to 14 and 25 to 30 is intended to additionally mix the emerging water with ambient air and to form it into a pearly-soft water jet.

To this end, a jet splitter 25 is provided in the insert housing 6 of the insert units 1, 2, 3, 4, 50, 60 shown in FIGS. 1 to 14 and 25 to 30, said jet splitter 25 having a multiplicity of flow-through holes 24 arranged in concentric hole circles, said flow-through holes 24 dividing the water flowing through into a corresponding number of individual jets. Since the flow-through holes 24 constrict the flow cross section, the flow rate of the water is increased in the region of these flow-through holes 24 such that, on the outflow side of the jet splitter 25, a negative pressure arises, by which ambient air is drawn into the housing interior of the insert housing 6. To this end, at least one aeration opening 17 is provided in the circumferential wall of the insert housing 6, said aeration opening 17 being provided in an annular zone, arranged preferably directly beneath the jet splitter 25 in the direction of flow, in the housing circumferential wall of the insert housing 6. The at least one aeration opening 17 opens into a mixing zone located in the housing interior of the insert housing 6, said mixing zone adjoining the jet splitter 25 on the outflow side of the latter.

The jet aerators 1, 2, 3, 4, 5, 50 and 60 shown in FIGS. 1 to 14 and 25 to 30 have, on the outflow-side end side of their insert housing 6, a flow straightener 18, 26, which has a honeycomb, lattice or mesh structure that is integrally formed on the insert housing 6 here. The flow straightener 18, in the form of a honeycomb structure, of the insert units 1, 2, 3, 4, 50, 60 has webs which intersect at intersection points and bound approximately honeycomb-shaped or hexagonal flow-through openings between one another. The flow straightener 18 is intended to form the individual jets that have been swirled in the housing interior and mixed with ambient air, into a homogeneous outlet jet again. The webs of the honeycomb, lattice or mesh structure therefore have a flow-guiding longitudinal extent, which can be greater than the greatest clear diameter of these flow-through holes of the flow straightener 18.

Introduced between the jet splitter 25 and the flow straightener 18 is at least one insert part 19, 20 and preferably two or even more than two insert parts 19, 20. These insert parts 19, 20 each likewise have a lattice or mesh structure with webs intersecting one another at intersection points, said webs likewise bounding flow-through openings 21 between one another. These insert parts are intended to additionally divide the individual jets produced in the jet splitter 25 and to favor mixing with ambient air. Each of the insert parts 19, 20 has, on its outer circumference, an annular wall 22 which is integrally connected to the webs of the lattice or mesh structure of these insert parts 19, 20. The annular walls 22, stacked one above another, of the mutually adjacent insert parts 19, 20 rest on one another and are dimensioned such that the lattice or mesh structures are arranged at a defined spacing from one another. The insert parts 19, 20 are held in the insert housing 6 so as to be prevented from rotating, wherein the webs of an outflow-side insert part 20 should be aligned with the flow-through openings 21 of the inflow-side insert part 19 adjacent thereto.

In order to prevent the insert parts 19, 20 from rotating, said insert parts 19, 20 have, on the outer circumference of their annular walls 22, at least one securing protrusion 27 or at least one securing recess, which securing means 27 cooperates with a complementary mating recess 28 or a mating protrusion on the housing inner circumference of the insert housing 6. In the case of the insert units 1, 2, 3, 4, 50, 60 that are shown here and are in the form of jet aerators, the damper housing 12 is releasably connectable to the jet splitter 25. To this end, the jet splitter 25 has a central insertion opening 29. On its outer circumferential side, the damper housing 12 has an encircling insertion stop 33 that is in the form of an annular shoulder here. In this case, the damper housing 12 is insertable into the insertion opening 29 from the inflow side, until the insertion stop 33 butts against a mating stop on the jet splitter 25. This mating stop is formed here by the circumferential rim, bounding the insertion opening 29, of the jet splitter 25. The damper housing 12 is held in the insertion opening 29 of the jet splitter 25 by a snap-fit connection or latching connection.

FIGS. 17A and 17B show that the damper housing 12 can also be connected integrally to the jet splitter 25, however. It is discernible from a comparison of FIGS. 17A and 17B, for the one part, and FIGS. 18A and 18B, for the other part, that the damper housing 12 can also be produced separately from the jet splitter 25 and be inserted into the insertion opening 29 of the jet splitter 25.

The damper housing 12 protrudes beyond the outflow side of the jet splitter 25. To this end, central insertion openings 27, 28, through which the damper housing 12 passes, are also provided in the annular insert parts 19, 20 and optionally also in the flow straightener.

In this case, the movement damper has a pressure stage, which is active under the pressure of the inflowing water and during which the valve moves from its rest position into the open position, and a rebound stage, during which a restoring movement of the damper piston 13 from the open position into the rest position of the valve takes place. In order to allow the flow of water to build sufficiently slowly after an outlet valve connected upstream or downstream of the insert unit 1, 2, 3, 4, 5, 50, 60 has been opened, the pressure stage of the movement damper is configured to be harder than the rebound stage. On that end side of the damper piston 13 that faces away from the direction of flow, a ring seal 36 is provided to this end, said ring seal 36 butting against this end side during the pressure stage of the movement damper, such that the ring seal 36 closes the return-flow ducts and the viscous fluid can flow only through the connecting duct provided centrally in the damper piston 13. Since, therefore, the flow cross section for the fluid is reduced during the pressure stage, this flow-through of the fluid through the at least one connecting duct is rendered more difficult compared with the rebound stage.

The insert unit 1 shown in FIGS. 1 to 4 is in the form of a jet aerator. While the insert unit 1 configured as a jet aerator is illustrated in the rest position in FIG. 1 and in the open position of its valve in FIG. 3, FIG. 2 shows this insert unit 1 in an intermediate position shortly after the opening of the outlet fitting 9 and the outlet valve provided therein.

The insert units 1, 2, 3, 4, 5, 50, 60 illustrated in FIGS. 1 to 14 and 25 to 30 each have, on their inflow-side end side, a dome screen or filter screen 30. In the case of the insert unit 1 shown in FIGS. 5 to 7, a flow rate regulator 31 is interposed between the dome screen or filter screen 30 and the jet splitter 25. The flow rate regulator 31 provided in the insert housing 2 of the insert part 2 has an elastic throttle body 32, which delimits a control gap between itself and at least one regulating profile, said control gap changing the clear flow cross section under the pressure of the medium flowing through, such that the flow rate regulator 31 shown here regulates and limits the volume of water flowing through per unit time to a fixed maximum value. In this case, the regulating profile can be provided either on the outer circumference of a central regulating core 37 around which the throttle body 32 engages and/or on a circumferential wall 38 encasing the throttle body 32.

In the case of the insert units 1, 2, 3, 4, 60 shown in FIGS. 1 to 14 and 29 to 30, the dome screen or filter screen 30 is releasably latchable to the insert housing 6, or releasably connected thereto in a similar manner, via a sleeve-like or annular intermediate piece 39. The intermediate piece 39 provided on the inflow side of the insert housing 6 has the flow-through opening serving as a valve seat 16. Provided that this flow-through opening represents a cross-sectional constriction of the clear pipe cross section, the flow-through opening provided in the intermediate piece 39 can also act as a throttle.

In the case of the insert unit 50 shown in FIGS. 25 to 28, the dome screen or filter screen 30 is directly connected releasably to the insert housing 6 on the inflow side of the latter. To this end, the insert housing 6 has an inflow-side recess, in which the dome screen or filter screen 30 is releasably engaged with its outer circumferential rim. The dome screen or filter screen 30 has a central region, which has a multiplicity of screen openings. This central region, having the screen openings, of the dome screen or filter screen 30 is bounded by a hole-free annular zone of the dome screen or filter screen 30. The outer hole-free annular zone, for the one part, and the central region, having the screen openings, of the dome screen or filter screen 30, for the other part, are separated from one another on the outflow side of the filter screen 30 by the flow-through opening serving as a valve seat 16. Since the dome screen or filter screen 30 is held directly on the insert housing 6 of the insert unit 50 and since it is thus possible to dispense with an additional intermediate piece, the insert unit 50 illustrated in FIGS. 25 to 28 is distinguished by a smaller number of components and easier mounting.

FIGS. 8 to 11 and 25 to 30 show that the for instance plate-shaped valve piston 10 bears a surface layer 40 made of elastic material, at least in the annular zone butting against the valve seat 16 in the rest position. This surface layer 40 is mounted on the valve piston 10 so as to be displaceable in a radial direction. By way of the pressure of the inflowing water, this surface layer 40 is pressed together and displaced radially outwards such that brief troublesome noises during the opening movement of the valve are counteracted. The surface layer 40 at least of the exemplary embodiments shown in FIGS. 8 to 11 and 25 to 28 is in this case configured in the form of an annular disk, wherein the annular-disk opening of this surface layer has a peg 47 protruding from the valve piston passing through it. Since this sealing elastic surface layer 40, with which audible troublesome noises are intended to be avoided during the sliding movement of the valve piston 10, possibly comes away from the valve seat 16 only with difficulty in the rest position of the valve, the circumferential rim, in the form of a valve seat 16, in the insert housing 2 of the insert unit 3 has the at least one peripherally open indentation 41, illustrated in more detail in FIG. 9, which is water-permeable even in the rest position of the valve. This groove-like indentation 41 is intended to avoid excessive sealing between the valve seat 16 and the surface layer 40 borne by the valve piston 10, in that, even in the rest position of the valve, water can flow past the plate-shaped valve piston 10 through the inflow-side and inner-circumferential small groove-like indentations 41, until the valve opens with time and moves into its open position. Additionally or alternatively, however, comparable groove-like indentations can also be provided in the valve piston 10 in the region of the annular zone impinging on the valve seat 16 and in particular in the elastic surface layer 40 thereof.

For the same purpose, at least one bypass duct is integrated into the valve piston 10 of the insert unit 50 shown in FIGS. 25 to 28. This at least one bypass duct 51 is discernible best in the perspective illustrations of individual parts according to FIGS. 27 and 28. In FIGS. 27 and 28, these bypass ducts 51 project from a portion of the valve piston. By way of these bypass ducts, tolerance fluctuations of the elastic surface layer 40 can be compensated better. Should this elastic surface layer 40 turn out to be larger or thicker, this is irrelevant for the bypass ducts 51 integrated into the valve piston 10, since a certain bypass is ensured even in the rest position of the valve. In the case of the insert unit 50, undesired sealing off of the valve seat 16 is avoided even if a larger elastic surface layer were to close the indentations 41 provided in an intermediate piece 39 (cf. FIG. 9).

Figure 13:
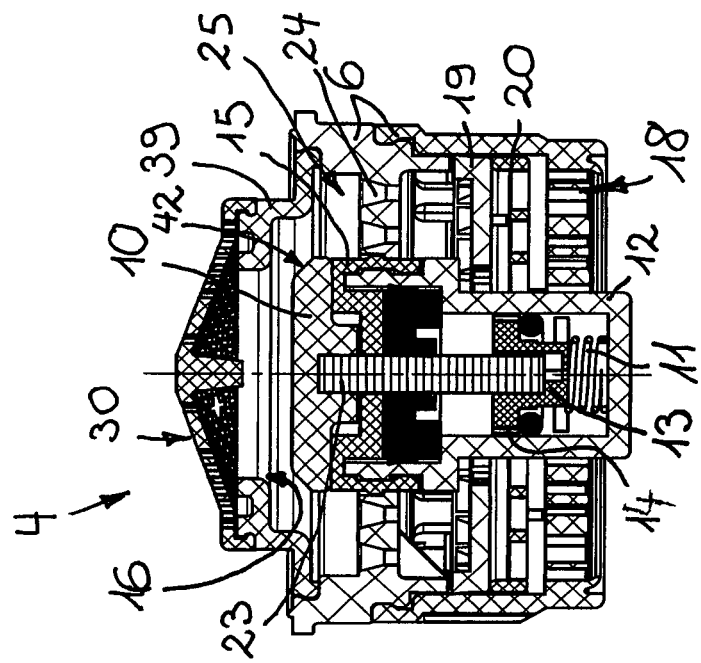
FIG. 13 shows the insert unit from FIG. 12 in longitudinal section in the open position of the valve.
Figure 12:
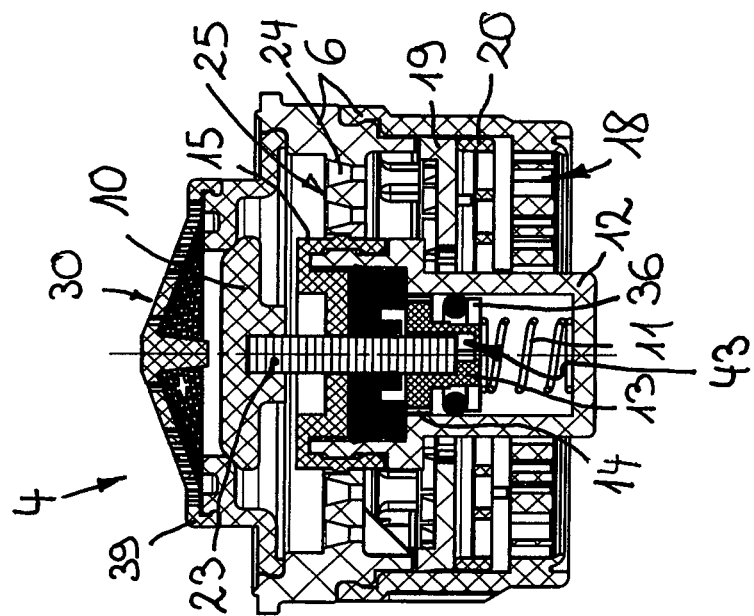
FIG. 12 shows an insert unit, shown in longitudinal section and configured as a jet aerator, in the rest position of the valve, wherein the plate-shaped valve piston bears, on its plate rim butting against the valve seat in the rest position, a rounding or a chamfer, which is intended to counteract audible troublesome noises during the sliding movement of the valve piston.
Figure 14:
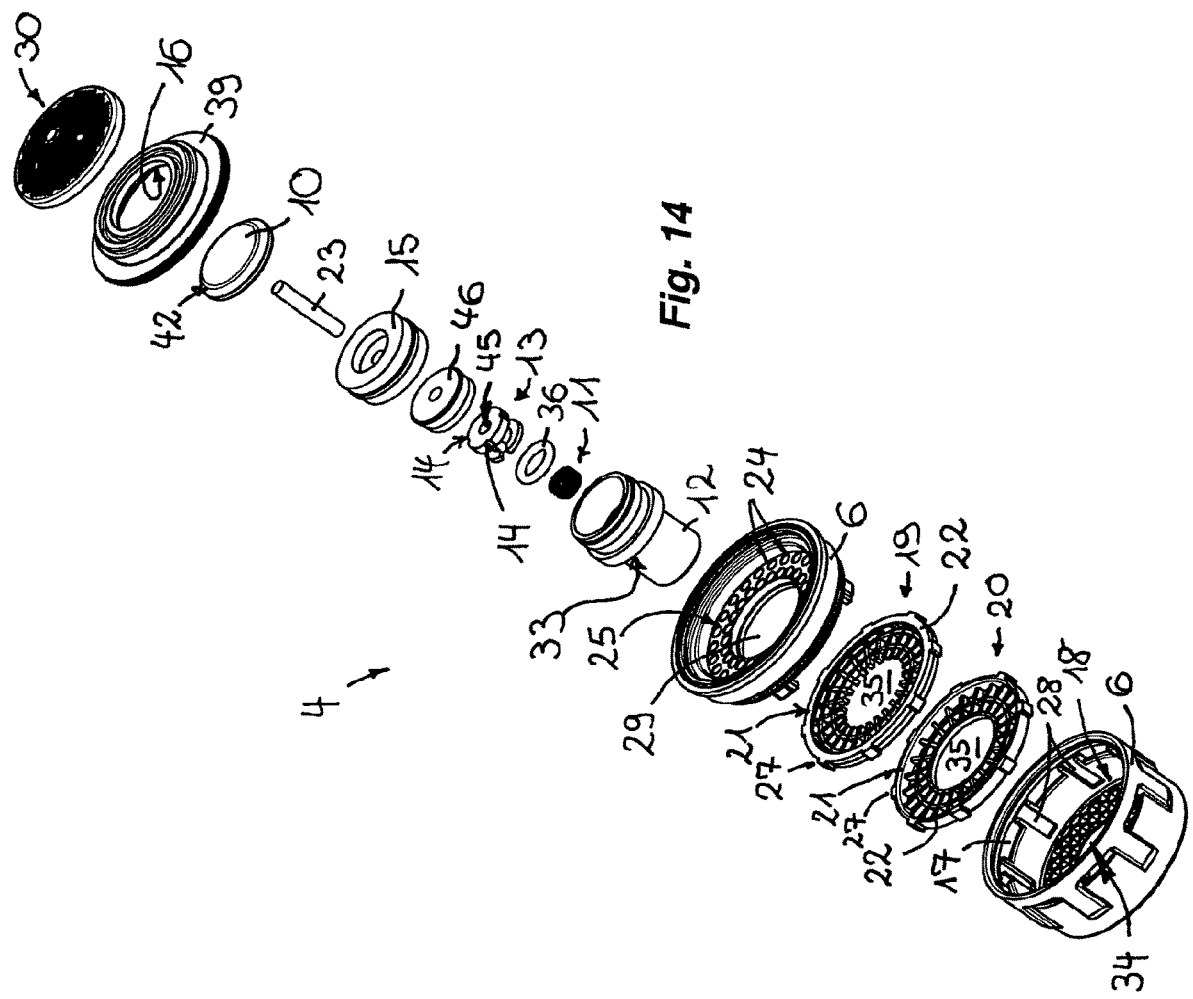
FIG. 14 shows the insert unit from FIGS. 12 and 13 in an exploded perspective illustration of its constituent parts.
Figure 26:
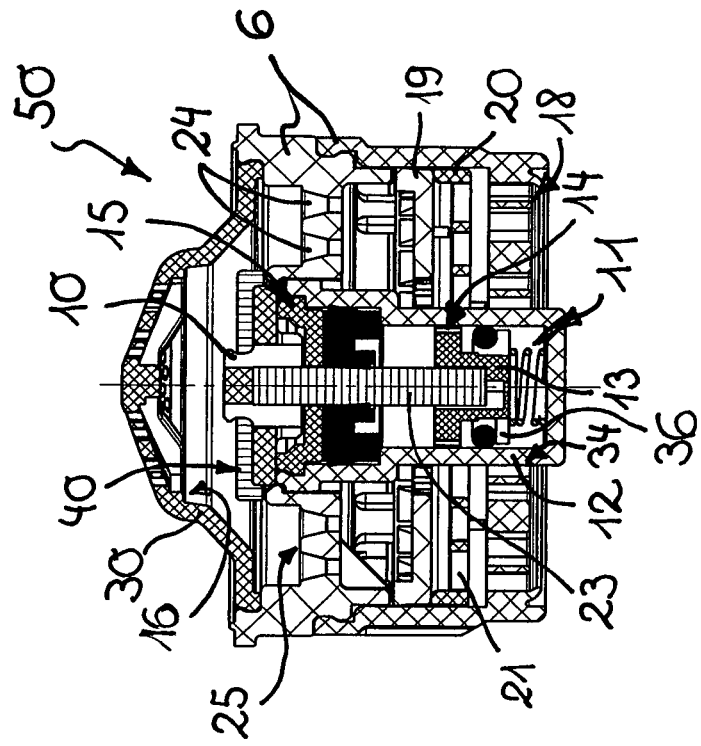
FIG. 26 shows the insert unit, likewise in longitudinal section here, from FIG. 25 in the open position of the valve located in the insert housing.
Figure 25:
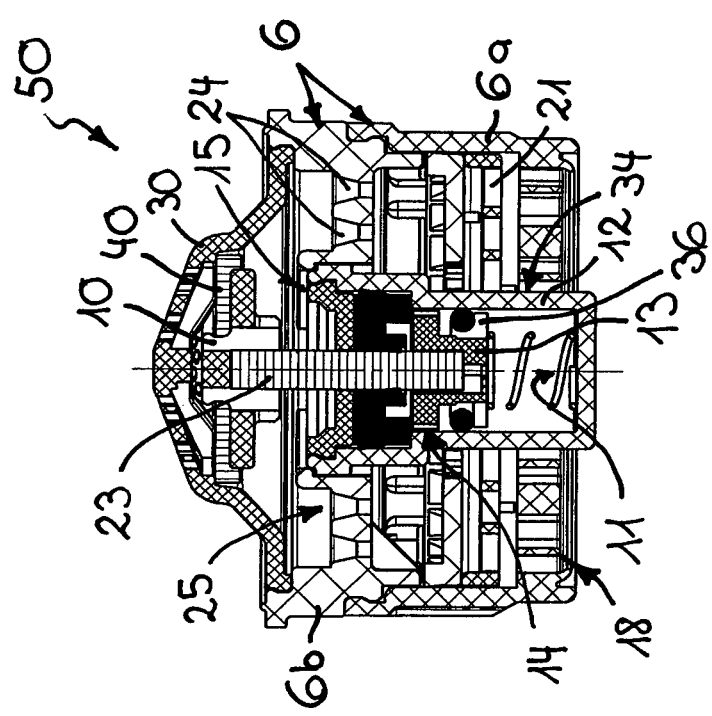
FIG. 25 shows an insert unit, likewise in the form of a jet aerator and shown in longitudinal section, in an embodiment that is preferred because it is simplified, in the rest position of the valve provided in the insert housing.

The valve piston 10, likewise configured in a plate-shaped manner, of the insert unit 4 shown in FIGS. 12 to 14 has a chamfer 42 or rounding in the piston peripheral region butting against the valve seat 16. By way of this chamfer 42 or rounding on the piston circumference, undesired troublesome noises are likewise intended to be counteracted during the sliding movement of the valve piston 10. The chamfer 42 or rounding provided on the circumference of the valve piston 10 possibly has the drawback, however, that, within a very short time, a relatively large quantity of water flows past the valve piston 10, and so the desired building of the flow of water during the opening of the outlet fitting 9 is counteracted somewhat.

The insert unit 5 shown in FIGS. 21 to 24 is mountable between two pipe sections of a water pipe, for example in the corner valve or connection valve 7 shown in FIG. 20. On the inner circumference of its insert housing 2, the insert unit 5 has radially inwardly protruding webs, which form a central insertion opening 34, into which the damper housing 12 of the movement damper can be introduced until the insertion stop 33 provided on the outer circumference of this damper housing 12 butts against the rims, serving as mating stops and bounding the insertion opening 34, of the webs. The webs, which are arranged in a star shape with respect to one another, in this case form a flow straightener 26, which is intended to homogenize the flow of water. It is clear from a comparison of FIGS. 15 to 18*b*, for the one part, and FIGS. 21 to 24, for the other part, that, even in the case of the insert unit 5, however, the damper housing 12 of the movement damper can be integrally connected directly to the insert housing 2 via the flow straightener 26.

The valve piston 10 of the insert unit 60 shown in FIGS. 29 and 30 bears an elastic surface layer 40, which engages behind the inflow-side plate-shaped subregion of the valve piston 10 with its external circumferential-rim region, and in this way is held securely and firmly on the valve piston 10. Although it is conceivable to produce the valve piston 10 with its elastic surface layer 40 as a multicomponent injection-molding, the embodiment illustrated here, in which the valve piston 10 and the elastic surface layer 40 are produced as separate components and are subsequently assembled together, is much easier and cost-effective to produce.

A damper housing 12, which is latchable and preferably releasably latchable to the jet splitter 25, is also provided in the case of the insert unit 60. The insertion stop 33 is to this end provided on the inflow-side housing circumference of the damper housing 12 and cooperates here with a mating stop, which is in the form of an annular shoulder or annular groove bounding the insertion opening 29 in the jet splitter 25 on the inflow side. Integrally formed in the outflow-side peripheral region, bounding the insertion opening 29, of the jet splitter 25 is an encircling collar 62, which engages with its free collar rim in a latching manner behind an annular shoulder on the housing circumference of the damper housing 12 and thus holds the damper housing 12 securely on the jet splitter 25. This annular shoulder is formed in this case by a circumferentially protruding annular flange 63, which annular flange 63 butts against the webs of the lattice or mesh structure of this insert part 19, said webs bounding the central insertion opening 27 of the insert part 19 connected downstream on the outflow side.

The valve piston 10 of the insert unit 60 is in this case formed in a stepped manner, wherein the steps have a step diameter that reduces from step to step in the flow-through direction. In this case, the step that forms the inflow-side end face of the valve piston 10 is formed in a plate-shaped manner. The elastic surface layer 40 can in this case also have a central opening on its inflow-side end face, in order, if necessary, to receive an injection point on the valve piston 10.

Figure 31:
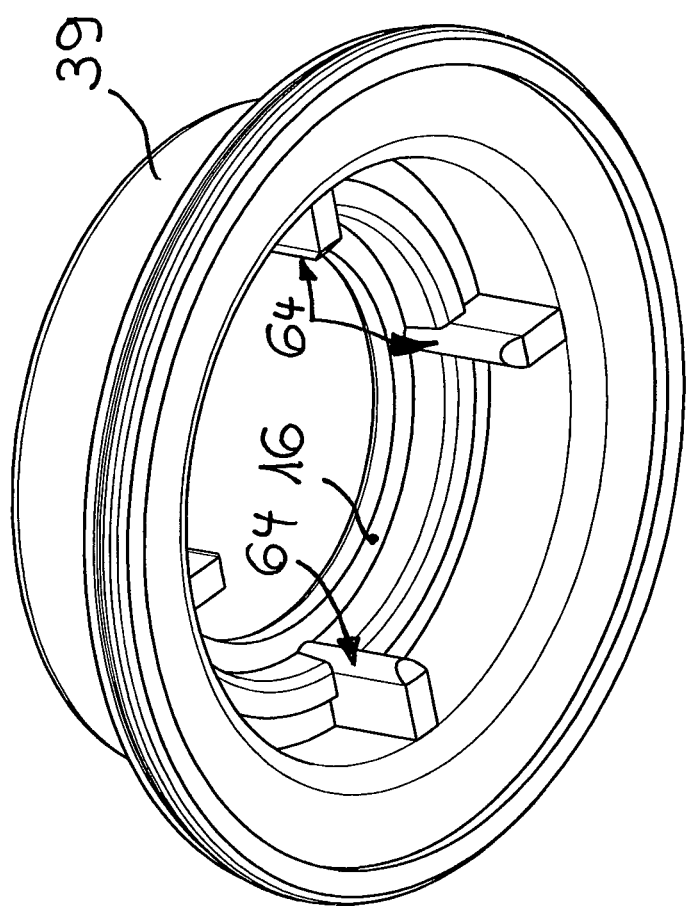
FIG. 31 shows the valve seat of the valve provided in the insert unit according to FIGS. 29 and 30 in a plan view of the outflow side of the valve seat.

It is discernible from the bottom view, shown in FIG. 31, of the outflow side of the intermediate piece 39 that guide webs 64 are provided on the outflow side of the valve seat 16, which guide webs 64 are arranged on the valve seat 16 at preferably regular spacings around the valve piston 10 and are oriented in the sliding longitudinal direction of the valve piston 10. Between these guide webs 64, on which the valve piston 10 is guided in a linear manner during its sliding movement, the valve piston 10 is clamped in place such that undesired sliding, rocking and squeaking noises during the sliding movement of the valve piston 10 are counteracted. As can be seen in FIGS. 29 and 30, the elastic surface layer 40 has, on its inflow-side circumferential rim, a radially protruding annular flange 65. This annular flange 65 forms, on the surface layer 40, an elastomer lip, into which the guide webs 64 can be formed.

LIST OF REFERENCE SIGNS

1 Insert unit (according to FIGS. 1 to 4)
2 Insert unit (according to FIGS. 5 to 7)
3 Insert unit (according to FIGS. 8 to 11)
4 Insert unit (according to FIGS. 12 to 14)
5 Insert unit (according to FIGS. 21 to 24)
6 Insert housing
6a Outflow-side housing part
6b Inflow-side housing part
7 Corner valve or connection valve
8 Water outlet
9 Outlet fitting
10 Valve piston
11 Compression spring
12 Damper housing
13 Damper piston
14 Groove
15 Cover
16 Valve seat
17 Aeration opening
18 Flow straightener (according to FIGS. 1 to 14)
19 Insert part
20 Insert part
21 Flow-through opening
22 Annular wall
23 Piston rod
24 Flow-through holes
25 Jet splitter
26 Flow straightener (according to FIGS. 21 to 24)
27 Securing protrusion
28 Mating recess
29 Insertion opening
30 Dome screen
31 Flow rate regulator
32 Throttle body
33 Insertion stop
34 Insertion opening (in the flow straightener 18)
35 Insertion opening (in the insert parts 19, 20)
36 Ring seal
37 Regulating core
38 Circumferential wall
39 Intermediate piece
40 Surface layer
41 Indentation
42 Chamfer
43 Connecting duct
44 Indentation
45 Plug-in opening
46 Plug
47 Peg
50 Insert unit (according to FIGS. 25 to 28)
51 Bypass duct
60 Insert unit (according to FIGS. 29 and 30)
61 Annular groove
62 Collar
63 Annular flange
64 Guide webs
65 Annular flange on the surface layer 40

The invention claimed is:

1. A sanitary insert unit (1, 2, 3, 4, 5, 50, 60), comprising:
an insert housing (6),
a valve having a valve piston (10) and at least one restoring element in the insert housing (6), said valve piston (10) being guided in a displaceable manner in the insert housing (6) and movable from a rest position, under pressure of inflowing water, counter to a restoring force of the at least one restoring element, and
at least one movement damper, which damps or brakes a movement of the valve piston (10) from the rest position into an open position,
wherein the at least one movement damper is configured as a hydraulic damper which has a damper housing (12) and a damper piston (13) located in and guided in a displaceable manner in the damper housing (12),
wherein, during a sliding movement from the rest position into the open position, the damper piston (13) displaces oil or a viscous fluid from one side of the damper piston (13) to another side of the damper piston (13) through at least one connecting duct,
wherein the at least one restoring element is arranged between a closed housing bottom of the damper housing (12) and an end side of the damper piston (13) that faces away from the flow-through direction, and
wherein the at least one restoring element applies pressure to an end side of the damper piston (13) that faces away from a flow-through direction of the insert unit (1, 2, 3, 4, 5, 50, 60).

2. The sanitary insert unit as claimed in claim 1, wherein the at least one restoring element is a spring.

3. The sanitary insert unit as claimed in claim 1, wherein the at least one restoring element is a compression spring (11).

4. The sanitary insert unit as claimed in claim 1, wherein the valve piston (10) is connected to the damper piston (13) for movement via a piston rod (23).

5. The sanitary insert unit as claimed in claim 4, wherein the piston rod (23) is connected to the valve piston (10) at first rod end thereof oriented counter to a direction of flow, and is connected to the damper piston (13) at a second rod end thereof that is directed in the direction of flow.

6. The sanitary insert unit as claimed claim 1, wherein, in the rest position, the valve piston (10) of the valve butts at least partially against a circumferential rim in the insert housing (6), said circumferential rim forming a valve seat (16) and bounding a flow-through opening.

7. The sanitary insert unit as claimed in claim 6, wherein the valve piston (10) of the valve is spaced apart, in the open position, from the valve seat (16), in the insert housing (6).

8. The sanitary insert unit as claimed in claim 6, wherein the valve piston (10) bears a surface layer (40) made of elastic material, at least in an annular zone of an inflow-side piston end side, said annular zone butting against the valve seat (16) in the rest position.

9. The sanitary insert unit as claimed in claim 6, wherein the valve piston (10) bears a surface layer (40) made of elastic material on an end side facing the valve seat (16), said surface layer being displaceably mounted on the valve piston (10) for movement in a radial direction.

10. The sanitary insert unit as claimed in claim 9, wherein the surface layer (40) is configured as an annular disk having an annular-disk opening through which a peg (47), protruding from the valve piston (10), passes.

11. The sanitary insert unit as claimed in claim 9, wherein the circumferential rim, in the insert housing (6) has at least one peripheral indentation (41) that is water-permeable even in the rest position of the valve.

12. The sanitary insert unit as claimed in claim 9, wherein the valve piston (10) includes a piston circumferential rim facing the valve seat (16) that is chamfered or is rounded.

13. The sanitary insert unit as claimed in claim 9, further comprising an annular or sleeve-shaped intermediate piece (39) on an inflow side of the insert housing (6), said intermediate piece (39) has a flow-through opening serving as a valve seat (16).

14. The sanitary insert unit as claimed in claim 13, further comprising at least one of a dome screen or filter screen (30) located on an inflow side of the intermediate piece (39).

15. The sanitary insert unit as claimed in claim 9, wherein the surface layer (40) engages with a circumferential-rim region thereof behind the valve piston (10).

16. The sanitary insert unit as claimed in claim 9, further comprising guide ribs or guide webs (64) on an outflow side of the valve seat (16), said guide ribs or guide webs (64) each forming a linear piston guide for the valve piston (10) during the sliding movement of the valve piston (10).

17. The sanitary insert unit as claimed in claim 16, wherein the surface layer (40) has a circumferentially protruding annular flange (65), and the guide ribs or guide webs (64) impinge on the circumferentially protruding annular flange (65) of the surface layer (40).

18. A sanitary insert unit (1, 2, 3, 4, 5, 50, 60), comprising:
an insert housing (6),
a valve having a valve piston (10) and at least one restoring element in the insert housing (6), said valve piston (10) being guided in a displaceable manner in the insert housing (6) and movable from a rest position, under pressure of inflowing water, counter to a restoring force of the at least one restoring element, and
at least one movement damper, which damps or brakes a movement of the valve piston (10) from the rest position into an open position,
wherein the at least one movement damper is configured as a hydraulic damper which has a damper housing (12)$_7$ and a damper piston (13) located in and guided in a displaceable manner in the damper housing (12),
wherein, during a sliding movement from the rest position into the open position, the damper piston (13) displaces oil or a viscous fluid from one side of the damper piston (13) to another side of the damper piston (13) through at least one connecting duct,
and wherein the sanitary insert unit (1, 2, 3, 4, 50, 60) comprises a jet aerator that mixes water flowing therethrough with ambient air.

19. The sanitary insert unit as claimed in claim 18, wherein the jet aerator includes a jet splitter (25), which divides the water flowing therethrough into a multiplicity of individual jets.

20. The sanitary insert unit as claimed in claim 19, wherein the jet splitter (25) comprises a perforated plate, which has a multiplicity of flow-through holes (24) that form the individual jets.

21. The sanitary insert unit as claimed in claim 19, wherein, in a housing circumferential wall of the insert housing (6), at least one aeration opening (17) is provided, which is provided in an annular zone of the housing circumferential wall, said annular zone being arranged directly beneath the jet splitter (25) in a direction of flow.

22. The sanitary insert unit as claimed in claim 19, wherein the jet aerator has an outflow-side flow straightener (18) having a honeycomb, lattice or mesh structure, and said honeycomb, lattice or mesh structure is formed by webs that intersect at intersecting points.

23. The sanitary insert unit as claimed in claim 22, wherein the honeycomb, lattice or mesh structure of the flow straightener (18) is integrally formed on the insert housing (6).

24. The sanitary insert unit as claimed in claim 22, further comprising, at least one insert part (19, 20) having a lattice or mesh structure made up of webs that intersect at intersecting points, the at least one insert part (19, 20) is located between the jet splitter (25) and the flow straightener (18).

25. The sanitary insert unit as claimed in claim 24, wherein the at least one insert part (19, 20) has, at least on an outer circumference thereof, an encircling annular wall (22), and the lattice or mesh structure of said insert part (19, 20) is integrally formed with the annular wall (22).

26. The sanitary insert unit as claimed in claim 19, wherein the damper housing (12) is releasably connectable or integrally connected to the jet splitter (25).

27. The sanitary insert unit as claimed in claim 26, wherein the damper housing (12) is held in an insertion opening (29) of the jet splitter (25) by a latching or snap-fit connection.

28. The sanitary insert unit as claimed in claim 27, wherein the jet splitter (25) and the flow straightener (26) each have an insertion opening (29, 34, 35) passing therethrough, and the damper housing (12) passes through said insertion openings.

29. The sanitary insert unit as claimed in claim 19, wherein, during a sliding movement during use, the damper piston (13) displaces the oil or the viscous fluid through the at least one connecting duct during movement from the rest position into the open position and through at least one return-flow duct during movement from the open position into the rest position.

30. The sanitary insert unit as claimed in claim 29, further comprising an insertion stop (33) on an outer circumference of the damper housing (12), and the damper housing (12) is insertable into an insertion opening (29) in the jet splitter (25) until the insertion stop (33) butts against a mating stop on the jet splitter (25).

31. The sanitary insert unit as claimed in claim 29, wherein the damper piston (13) has, on an outer circumference thereof, at least one circumferentially open groove (14), which bounds the at least one return-flow duct together with the housing inner circumference of the damper housing (12).

32. The sanitary insert unit as claimed in claim 29, wherein the at least one connecting duct has, on an inflow side, a duct inlet, which is arranged on a piston end side of the damper piston (13) that faces a housing bottom of the damper housing (12).

33. The sanitary insert unit as claimed in claim 32, wherein the at least one connecting duct has, on an outflow side, a duct portion which is provided as an indentation (44) between the piston rod (23) and an inner circumferential wall, and said inner circumferential wall bounds a plug-in opening (45) in the damper piston (13), said plug-in opening (45) accommodating one rod end of a piston rod (23) that connects the valve piston (10) to the damper piston (13).

34. The sanitary insert unit as claimed in claim 31, wherein the movement damper has a pressure stage, which is active under the pressure of the inflowing water and during which the valve moves from the rest position into the open position, and a rebound stage, during which a restoring movement of the damper piston from the open position into the rest position of the valve takes place.

35. The sanitary insert unit as claimed in claim 34, wherein the pressure stage of the movement damper is configured to be harder than the rebound stage.

36. The sanitary insert unit as claimed in claim 34, further comprising a ring seal (36) on an end side of the damper piston (13) that faces away from a flow-through direction of the insert unit (1, 2, 3, 4, 5, 50, 60), said ring seal (36) closing the at least one return-flow duct during a sliding movement of the damper piston (13) from the rest position into the open position.

37. A sanitary insert unit (1, 2, 3, 4, 5, 50, 60), comprising:
an insert housing (6),
a valve having a valve piston (10) and at least one restoring element in the insert housing (6), said valve piston (10) being guided in a displaceable manner in the insert housing (6) and movable from a rest position, under pressure of inflowing water, counter to a restoring force of the at least one restoring element, and
at least one movement damper, which damps or brakes a movement of the valve piston (10) from the rest position into an open position,
wherein the at least one movement damper is configured as a hydraulic damper which has a damper housing (12) and a damper piston (13) located in and guided in a displaceable manner in the damper housing (12),
wherein, during a sliding movement from the rest position into the open position, the damper piston (13) displaces oil or a viscous fluid from one side of the damper piston (13) to another side of the damper piston (13) through at least one connecting duct,
wherein the at least one restoring element is arranged between a closed housing bottom of the damper housing (12) and an end side of the damper piston (13) that faces away from the flow-through direction,
wherein the at least one restoring element applies pressure to an end side of the damper piston (13) that faces away from a flow-through direction of the insert unit (1, 2, 3, 4, 5, 50, 60),
wherein the at least one movement damper comprises a pressure stage, which is active under the pressure of the inflowing water and during which the valve moves from the rest position into the open position, and a rebound stage, during which a restoring movement of the damper piston (13) from the open position into the rest position of the valve takes place, and
wherein the pressure stage of the movement damper is configured to be more inhibited than the rebound stage.

* * * * *